United States Patent
Nakaso et al.

(10) Patent No.: US 10,266,713 B2
(45) Date of Patent: Apr. 23, 2019

(54) PARTICLE DISPERSION LIQUID, AQUEOUS INK, INK CARTRIDGE, RECORDING APPARATUS, AND RECORDING METHOD

(71) Applicant: FUJI XEROX CO., LTD., Tokyo (JP)

(72) Inventors: Suguru Nakaso, Minamiashigara (JP); Naomi Miyamoto, Minamiashigara (JP); Takahiro Ishizuka, Minamiashigara (JP); Soichiro Kitagawa, Minamiashigara (JP)

(73) Assignee: FUJI XEROX CO., LTD., Tokyo (JP)

(*) Notice: Subject to any disclaimer, the term of this patent is extended or adjusted under 35 U.S.C. 154(b) by 27 days.

(21) Appl. No.: 15/643,867

(22) Filed: Jul. 7, 2017

(65) Prior Publication Data

US 2018/0273785 A1 Sep. 27, 2018

(30) Foreign Application Priority Data

Mar. 23, 2017 (JP) .................. 2017-057924
Mar. 24, 2017 (JP) .................. 2017-059889

(51) Int. Cl.
| | | |
|---|---|---|
| C09D 11/326 | (2014.01) | |
| C09D 11/104 | (2014.01) | |
| C09D 11/107 | (2014.01) | |
| C09D 11/10 | (2014.01) | |
| C09D 11/02 | (2014.01) | |
| B41J 2/175 | (2006.01) | |
| C09D 11/106 | (2014.01) | |

(52) U.S. Cl.
CPC ......... *C09D 11/326* (2013.01); *B41J 2/17503* (2013.01); *C09D 11/02* (2013.01); *C09D 11/10* (2013.01); *C09D 11/104* (2013.01); *C09D 11/106* (2013.01); *C09D 11/107* (2013.01)

(58) Field of Classification Search
CPC ... C09D 11/104; C09D 11/326; C09D 11/107; B41J 2/17503
USPC .................. 524/832, 841; 523/161
See application file for complete search history.

(56) References Cited

U.S. PATENT DOCUMENTS

| | | | |
|---|---|---|---|
| 5,256,620 A | 10/1993 | Burberry et al. | |
| 2003/0138723 A1 | 7/2003 | Purbrick et al. | |
| 2004/0132863 A1 | 7/2004 | Narita et al. | |
| 2015/0093698 A1* | 4/2015 | Tian ................. | G03G 9/09775 430/108.5 |
| 2017/0015855 A1* | 1/2017 | Sakamoto ............. | C09D 11/38 |

FOREIGN PATENT DOCUMENTS

| | | |
|---|---|---|
| JP | H06-210972 A | 8/1994 |
| JP | H11-21460 A | 1/1999 |
| JP | 2001-226618 A | 8/2001 |

(Continued)

*Primary Examiner* — Fred M Teskin
(74) *Attorney, Agent, or Firm* — Oliff PLC

(57) ABSTRACT

A particle dispersion liquid includes: an aqueous medium; at least one of a compound represented by Formula (I) and a compound represented by Formula (II), which is dispersed in the aqueous medium; and at least one of: (i) a polymer having alkyl (meth) acrylate as a structural unit, the alkyl (meth) acrylate containing an alicyclic hydrocarbon group having a bridged bond, the polymer having an acid value ranging from 6 mgKOH/g to 100 mgKOH/g, and (ii) a polyester resin containing 20% by mass or more of a unit represented by Formula (F1) in the polyester.

17 Claims, 1 Drawing Sheet

(56) References Cited

FOREIGN PATENT DOCUMENTS

| JP | 2003-231819 A | 8/2003 |
| JP | 2004-203996 A | 7/2004 |
| JP | 2013-189596 A | 9/2013 |

* cited by examiner

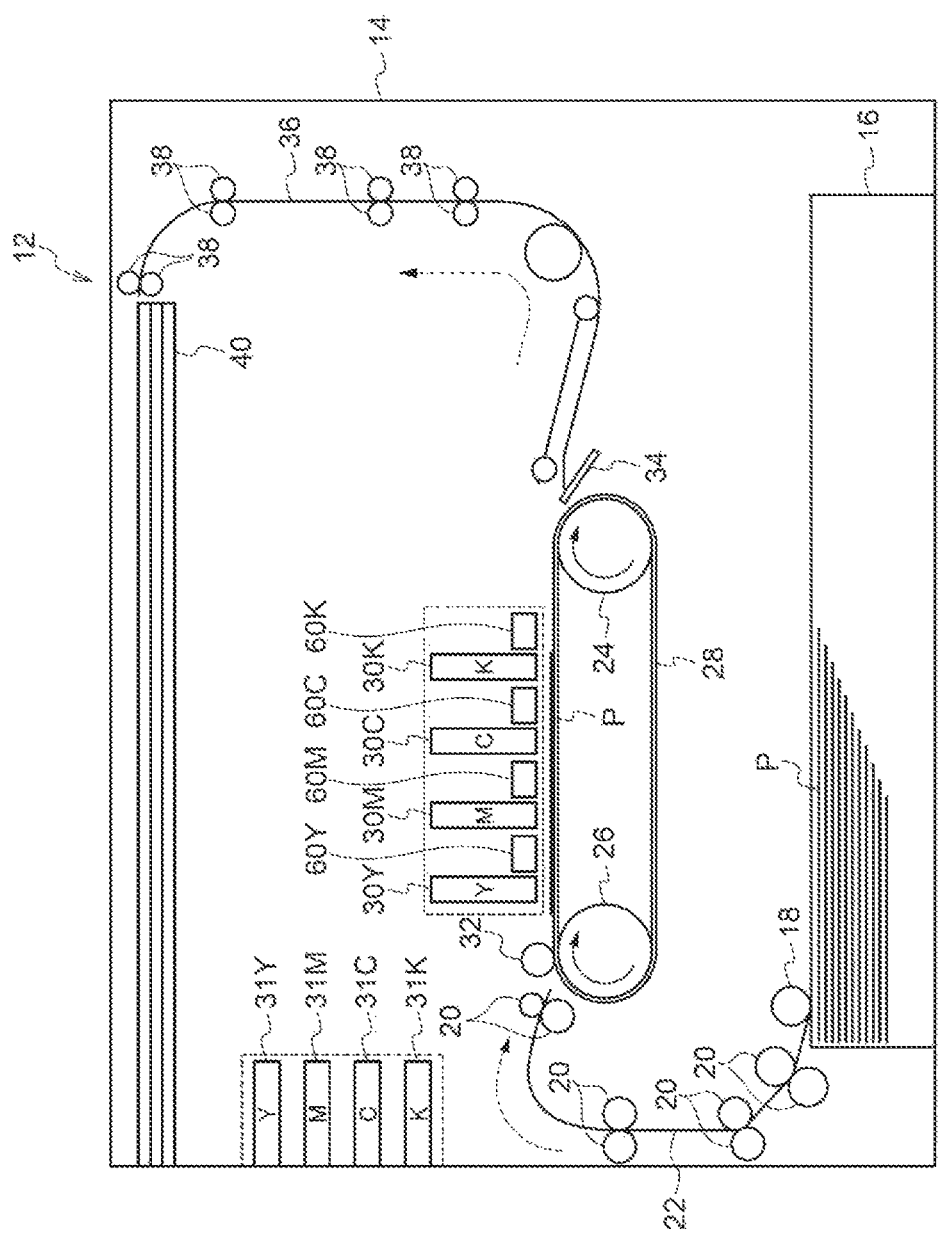

PARTICLE DISPERSION LIQUID, AQUEOUS INK, INK CARTRIDGE, RECORDING APPARATUS, AND RECORDING METHOD

CROSS-REFERENCE TO RELATED APPLICATIONS

This application is based on and claims priorities under 35 USC 119 from Japanese Patent Application No. 2017-057924 filed on Mar. 23, 2017, and Japanese Patent Application No. 2017-059889 filed on Mar. 24, 2017.

BACKGROUND

Technical Field

The present invention relates to a particle dispersion liquid, an aqueous ink, an ink cartridge, a recording apparatus, and a recording method.

Related Art

A composition containing an infrared absorbing agent is known as an ink, a toner, or the like which is fixed on a recording medium by light irradiation.

SUMMARY

According to an aspect of the invention, there is provided a particle dispersion liquid including:

an aqueous medium;

at least one of a compound represented by Formula (I) and a compound represented by Formula (II), which is dispersed in the aqueous medium; and at least one of:

(i) a polymer having alkyl (meth) acrylate as a structural unit, the alkyl (meth) acrylate containing an alicyclic hydrocarbon group having a bridged bond, the polymer having an acid value ranging from 6 mgKOH/g to 100 mgKOH/g, and (ii) a polyester resin containing 20% by mass or more of a unit represented by Formula (F1) in the polyester resin.

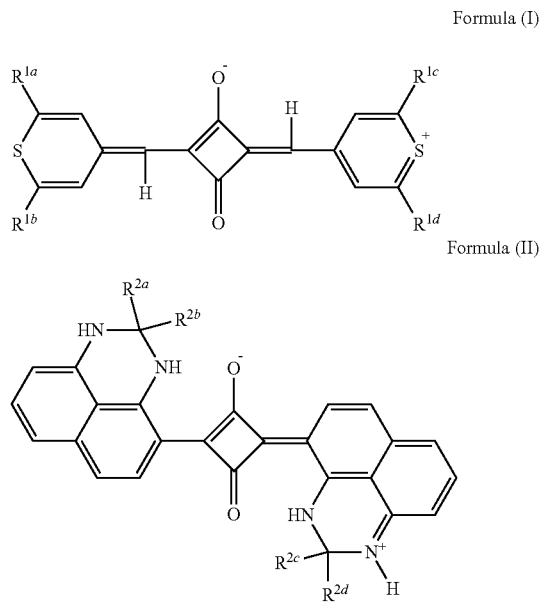

In Formula (I), $R^{1a}$, $R^{1b}$, $R^{1c}$, and $R^{1d}$ each independently represents an alkyl group or an aryl group.

In Formula (II), $R^{2a}$, $R^{2b}$, $R^{2c}$, and $R^{2d}$ each independently represents an alkyl group, $R^{2a}$ and $R^{2b}$, and $R^{2c}$ and $R^{2d}$ may be each independently linked to each other to form a ring.

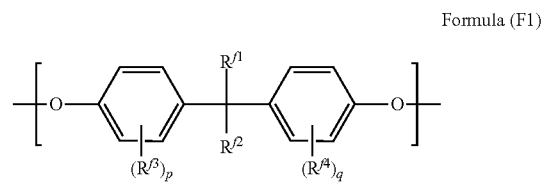

In Formula (F1), $R^{f1}$ and $R^{f2}$ each independently represents hydrogen or a methyl group, $R^{f3}$ and $R^{f4}$ represent methyl groups, and p and q each independently represents 0 or 1.

According to the aspect of the invention, a particle dispersion liquid having excellent concentration redispersibility is obtained compared with the case where the particle dispersion liquid does not include neither (i) the polymer nor (ii) the polyester resin.

BRIEF DESCRIPTION OF THE DRAWINGS

Exemplary embodiment(s) of the present invention will be described in detail based on the following FIGURE, wherein:

FIG. 1 is a schematic configuration diagram showing an example of an image forming apparatus according to an embodiment.

DETAILED DESCRIPTION

Hereinafter, embodiments of the invention will be described below. These descriptions and examples are illustrative of the embodiments and do not limit the scope of the invention.

In the present disclosure, in a case of referring to the amount of each component in the composition, in a case where there is a plurality of types of substances corresponding to each component in the composition, unless otherwise specified, it means the total amount of the plurality of types of substances present in the composition.

In the present disclosure, "alkyl" and "alkenyl" include not only chain hydrocarbons but also cyclic hydrocarbons.

In the present disclosure, "(meth) acrylate", "(meth) acrylic acid" refers to including acrylate (acrylic acid) and methacrylate (methacrylic acid), and "(meth) acryloyl" refers to including acryloyl and methacryloyl.

In the present disclosure, "aqueous medium" is water or a mixed solvent of water and another solvent, which refers to a mixed solvent containing water as a main solvent. In the present disclosure, "main solvent" refers to a solvent having the highest mass among all the solvents constituting the mixed solvent.

First Embodiment

<Particle Dispersion Liquid>

A particle dispersion liquid according to the embodiment is a dispersion liquid containing an aqueous medium and particles dispersed in the aqueous medium.

The particle contains at least one of compounds represented by Formula (I) and Formula (II) (that is, at least one of the compound represented by Formula (I) and the compound represented by Formula (II), and hereinafter also referred to as "specific compound") and a resin.

This resin has alkyl (meth) acrylate containing an alicyclic hydrocarbon group having a bridged bond (hereinafter also simply referred to as "bridged alicyclic group") as a structural unit (having a structural unit derived from an alkyl (meth) acrylate containing a bridged alicyclic group), and has an acid value of 6 mgKOH/g or more and 100 mgKOH/g or less (hereinafter also simply referred to as "specific resin").

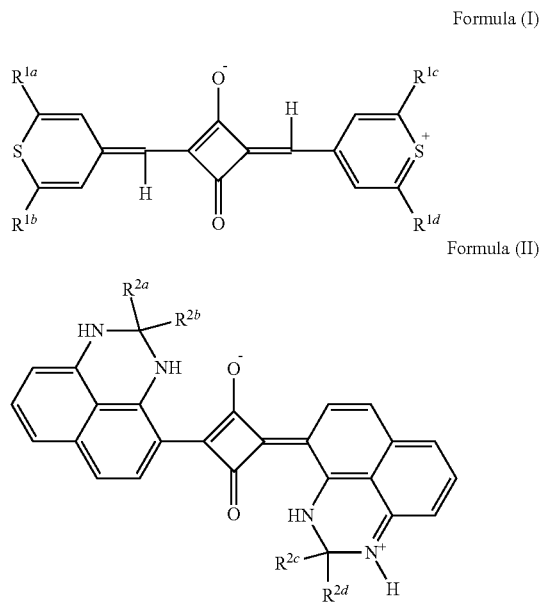

Formula (I)

Formula (II)

In Formula (I), $R^{1a}$, $R^{1b}$, $R^{1c}$, and $R^{1d}$ each independently represent an alkyl group or an aryl group.

In Formula (II), $R^{2a}$, $R^{2b}$, $R^{2c}$, and $R^{2d}$ each independently represent an alkyl group. $R^{2a}$ and $R^{2b}$, and $R^{2c}$ and $R^{2d}$ may be each independently linked to each other to form a ring.

In the related art, in order to contain a compound insoluble or hardly soluble in water into an aqueous medium, a technique of a particle dispersion liquid in which a particle is formed into a particle containing a compound and a resin, and dispersed in the aqueous medium is known.

In a case where such a particle dispersion liquid is used, for example, as an aqueous ink for an inkjet method (droplet ejection method), it is required to suppress clogging at an ejection port (inkjet head). Therefore, the particle dispersion liquid requires dispersibility (concentration redispersibility) even when a part of the aqueous medium in the dispersion liquid is once evaporated (for example, evaporating 60% by mass aqueous medium) and concentrated (for example, concentrating the aqueous medium to 40% by mass) and diluted by adding the aqueous medium again. If an aqueous ink has high concentration redispersibility, even when the particles are concentrated in the ejection port (inkjet head) due to heating at the time of ejection by the inkjet method and the particles remain as a solid content, since the ink is well dispersed in the aqueous medium in the aqueous ink ejected later, clogging of the ejection port (inkjet head) can be suppressed. Even in a case where the particle dispersion liquid is used in addition to the aqueous ink for the inkjet method, the concentration redispersibility is also required from the viewpoint of dispersion stability accompanying the change in the surrounding temperature environment.

From the above viewpoint, improvement of the concentration redispersibility is required for the particle dispersion liquid.

On the other hand, the particle dispersion liquid according to the present embodiment satisfies the above-mentioned constitution, so that excellent concentration redispersibility can be obtained.

The reason for this is presumed as follows.

First of all, in the present embodiment, the particles include a specific polymer as a resin. The specific polymer has an alkyl (meth) acrylate as a structural unit. The alkyl (meth) acrylate contains an alicyclic hydrocarbon group (bridged alicyclic group) having a bridged bond. The bridged alicyclic group is a hydrocarbon group having a complicated three-dimensional structure, and since the bridged alicyclic group has a property showing high hydrophobicity, it is considered that the particle has the high hydrophobicity.

Secondly, in the present embodiment, the particles include at least one of a compound represented by Formula (I) and a compound represented by Formula (II) as a specific compound. It is considered that the specific compound containing a plurality of aromatic rings has high affinity with the specific resin having the bridged alicyclic group which is the hydrocarbon group having the complicated three-dimensional structure. As a result, the particles exhibit excellent solubility (molecular dispersion state) in the particles using the specific resin as a matrix resin, exist in a state where the particles are finely dispersed, that is, in a state where aggregation is suppressed, and the specific resin also exists with high uniformity over the entire particle. Since the unevenness of the specific resin in the particles is suppressed in this manner, it is considered that the hydrophobicity of the particles is exerted with high uniformity over the entire particle surface.

As a result, in a case where the particle dispersion liquid contains an organic solvent in addition to the aqueous medium, even when a part of the aqueous medium in the dispersion liquid is once evaporated and concentrated (for example, concentrating the aqueous medium amount to 40% by mass), the particles are difficult to dissolve in the organic solvent and the particle dispersion liquid keeps the state of the particle, so that the particle dispersion liquid is well dispersed when the aqueous medium is added thereafter. In addition, even in a case where the particle dispersion liquid contains only the aqueous medium as the dispersion medium, the particle dispersion liquid keeps the state of the particle in an aqueous medium with fewer particles when concentrated, so that the particle dispersion liquid is well dispersed when the aqueous medium is added thereafter.

As described above, excellent concentration redispersibility is obtained in the embodiment.

In addition, the particle dispersion liquid of the present embodiment exhibits high infrared absorption performance (IR absorption performance) in a case where the specific compound has infrared (IR) absorption performance.

As described above, it is considered that the specific compound containing the plurality of aromatic rings and the specific resin having the bridged alicyclic group which is the hydrocarbon group having a complicated three-dimensional structure have a high affinity, and the particles using the specific resin as the matrix resin finely disperse in the particle dispersion liquid. Therefore, the particle dispersion liquid exhibits the IR absorption performance satisfactorily in a case where the specific compound has the IR absorption performance.

In addition, according to the present embodiment, it is possible to prepare with high yield when obtaining the particle dispersion liquid.

As described above, it is considered that high hydrophobicity due to the specific resin having the bridged alicyclic group is exerted with high uniformity over the entire particle surface, so that high dispersibility is obtained in the aqueous medium. In addition, the specific resin preferably has an acid value ranging from 6 mgKOH/g to 100 mgKOH/g. It is considered that when the acid value of the specific resin is 6 mgKOH/g or more, the dispersion stability of the particles in the aqueous medium is enhanced, and when the acid value is 100 mgKOH/g or less, the water solubility does not become too high and the formation property of the particles containing the specific resin and the specific compound is enhanced.

Furthermore, according to the particle dispersion liquid according to the present embodiment, it is possible to reduce the particle size of the particles.

As described above, it is considered that high hydrophobicity due to the specific resin having the bridged alicyclic group is exerted with high uniformity over the entire particle surface of the particle, so that high dispersibility is obtained in the aqueous medium. In addition, it is considered that an acid value of the specific resin is 6 mgKOH/g or more, so that the dispersion stability of the particles in the aqueous medium is enhanced.

In the present embodiment, the dispersion state of the particles may be emulsification in which liquid particles are dispersed or suspension in which solid particles are dispersed, and from the viewpoint of dispersion stability, suspension in which the solid particles are dispersed is preferable. That is, the particle dispersion liquid according to the present embodiment may be an emulsion in which the particles are dispersed in the aqueous medium in a liquid state or a suspension in which the particles are dispersed in the aqueous medium in a solid state, and from the viewpoint of dispersion stability of the particles, the particle dispersion liquid is preferable to be the suspension.

Hereinafter, the components, composition, preparation method, and the like of the particle dispersion liquid according to the embodiment will be described in detail.

[Specific Compound]

The particles contained in the particle dispersion liquid according to the embodiment contain at least one of compounds represented by Formula (I) and Formula (II) (that is, at least one of the compound represented by Formula (I) and the compound represented by Formula (II)).

—Compound Represented by Formula (I)—

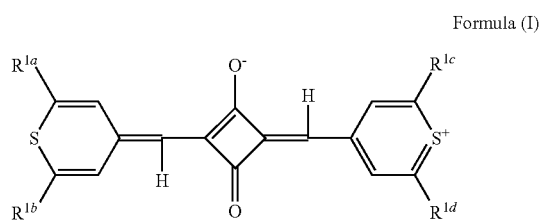

Formula (I)

(In Formula (I), $R^{1a}$, $R^{1b}$, $R^{1c}$, and $R^{1d}$ each independently represent an alkyl group or an aryl group.)

The alkyl group represented by $R^{1a}$, $R^{1b}$, $R^{1c}$, and $R^{1d}$ is preferably an alkyl group having 1 to 12 carbon atoms, more preferably an alkyl group having 1 to 10 carbon atoms, still more preferably an alkyl group having 3 to 6 carbon atoms, and still more preferably an alkyl group having 4 to 6 carbon atoms.

The alkyl group represented by $R^{1a}$, $R^{1b}$, $R^{1c}$, and $R^{1d}$ may be any of linear, branched, and cyclic alkyl groups, and examples thereof include a methyl group, an ethyl group, an n-propyl group, an isopropyl group, an n-butyl group, an isobutyl group (2-methylpropyl group), a sec-butyl group (1-methylpropyl group), a tert-butyl group (1,1-dimethylethyl group), an n-pentyl group, an isopentyl group (3-methylbutyl group), a neopentyl group (2,2-dimethylpropyl group), a tert-pentyl group (1,1-dimethylpropyl group), an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a 2-ethylhexyl group, a tert-octyl group, an n-nonyl group, an isononyl group, a sec-nonyl group, a tert-nonyl group, an n-decyl group, an isodecyl group, a sec-decyl group, a tert-decyl group, an n-undecyl group, an isoundecyl group, an n-dodecyl group, an isododecyl group, a cyclopropyl group, a cyclopentyl group, a cyclohexyl group, a bicyclo [2,2,2] octyl group, and the like.

Examples of the aryl group represented by $R^{1a}$, $R^{1b}$, $R^{1c}$, and $R^{1d}$ include a phenyl group and an alkyl-substituted phenyl group, and the like.

In the alkyl-substituted phenyl group, one phenyl group may be substituted with one alkyl group or a plurality of alkyl groups may be substituted with one alkyl group, but an alkyl-substituted phenyl group in which only one alkyl group is substituted is more preferable.

The alkyl group as the substituent is preferably an alkyl group having 1 to 10 carbon atoms, and examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, and the like.

Specific examples of the aryl group include a phenyl group, a 4-methylphenyl group, a 4-ethylphenyl group, a 4-propylphenyl group, a 4-butylphenyl group (particularly a 4-tert-butylphenyl group), a 3-methylphenyl group, a 2-methylphenyl group, and the like, and among these, a phenyl group is preferable.

The alkyl group and the aryl group represented by $R^{1a}$, $R^{1b}$, $R^{1c}$, and $R^{1d}$ may be substituted with a halogen atom (for example, fluorine and chlorine).

In the compound represented by Formula (I), at least one of the groups represented by $R^{1a}$, $R^{1b}$, $R^{1c}$, and $R^{1d}$ is preferably a branched alkyl group, and more preferably a compound represented by Formula (Ia).

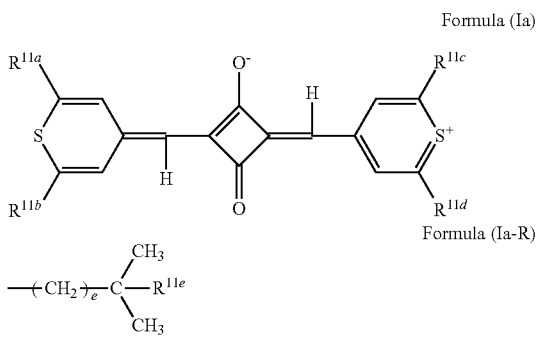

Formula (Ia)

Formula (Ia-R)

(In Formula (Ia), $R^{11a}$ represents a group represented by Formula (1-R), and $R^{11b}$, $R^{11c}$, and $R^{11d}$ each independently represent an alkyl group.

In Formula (1-R), $R^{11e}$ represents hydrogen or a methyl group, and e represents an integer of 0 or more and 3 or less.)

The total carbon number of the group represented by Formula (1-R) is preferably 6 or less, more preferably 5 or less, still more preferably 4 or less, and particularly preferably 4. The lower limit of the total carbon number is 3.

In Formula (1-R), $R^e$ represents hydrogen or a methyl group. $R^e$ is preferably a methyl group. In a case where $R^e$ is a methyl group, the group represented by Formula (1-R) has a structure in which the terminal is branched into three, and as compared with a case where $R^e$ is hydrogen, deterioration in the infrared absorption performance is suppressed.

In Formula (1-R), e represents an integer of 0 or more and 3 or less. e is preferably an integer of 0 or more and 2 or less, more preferably 0 or 1, and still more preferably 0. As e is smaller, the deterioration in the infrared absorption performance is suppressed.

Specific examples of the group represented by Formula (1-R) include an isopropyl group, an isobutyl group, a tert-butyl group, a 3-methylbutyl group (3-methylbutan-1-yl group), a 2,2-dimethylpropyl group (2,2-dimethylpropan-1-yl group), a 4-methylpentyl group (4-methylpentan-1-yl group), a 3,3-dimethylbutyl group (3,3-dimethylbutan-1-yl group), and a 4,4-dimethylpentyl group (4,4-dimethylpentan-1-yl group). Among these, an isopropyl group, an isobutyl group, a tert-butyl group are more preferable, and a tert-butyl group is still more preferable.

In Formula (Ia), $R^{11b}$, $R^{11c}$, and $R^{11d}$ each independently represent an alkyl group. At least one of $R^{11b}$, $R^{11c}$, $R^{11d}$ is preferably a group represented by Formula (1-R), and all of the $R^{11b}$, $R^{11c}$, and $R^{11d}$ are more preferably groups represented by Formula (1-R). As the number of groups represented by Formula (1-R) in Formula (Ia) is larger, the deterioration of the infrared absorption performance is further suppressed.

In a case where one of the $R^{11b}$, $R^{11c}$, and $R^{11d}$ is a group represented by Formula (1-R), any of $R^{11b}$, $R^{11c}$, and $R^{11d}$ may be a group represented by Formula (1-R). In a case where two of $R^{11b}$, $R^{11c}$, $R^{11d}$ are a group represented by Formula (1-R), any of $R^{11b}$, $R^{11c}$, and $R^{11d}$ may be a group represented by Formula (1-R).

In a case where two or more of $R^a$ to $R^d$ are groups represented by Formula (1-R), the structures of a plurality of groups represented by Formula (1-R) may be the same as or different from each other.

A preferable structure in the case where at least one of $R^{11b}$, $R^{11c}$, and $R^{11d}$ is a group represented by Formula (1-R) is as described above for $R^{11a}$.

The alkyl group in a case where at least one of $R^{11b}$, $R^{11c}$, and $R^{11d}$ is other than the group represented by Formula (1-R) may have any of linear, branched and cyclic structures. The alkyl group in this case preferably has a larger number of branches, and the carbon chain is preferably as short as possible. The number of carbon atoms is preferably 1 or more and 10 or less, more preferably 2 or more and 8 or less, and still more preferably 3 or more and 6 or less.

Specific examples of the alkyl group include a methyl group, an ethyl group, an n-propyl group, an n-butyl group, an n-pentyl group, an n-hexyl group, a sec-butyl group, a 2-methylbutan-2-yl group, a 3-methylbutan-2-yl group, a 3,3-dimethylbutan-2-yl group, a 3-pentyl group, a 2-methylpentan-3-yl group, a 3-methylpentan-3-yl group, a cyclopentyl group, a cyclohexyl group, and the like. Among these, the 2-methylbutan-2-yl group and the 3-methylpentan-3-yl group are preferred.

Specific examples (Compounds (I-a-1) to (I-a-10)) of the compound represented by Formula (I) are shown in Table 1 below.

TABLE 1

| NUMBER | $R^{1a}$ | $R^{1b}$ | $R^{1c}$ | $R^{1d}$ |
|---|---|---|---|---|
| I-a-1 | t-butyl | t-butyl | t-butyl | t-butyl |
| I-a-2 | i-propyl | i-propyl | i-propyl | i-propyl |
| I-a-3 | 2-methyl-propyl | 2-methyl-propyl | 2-methyl-propyl | 2-methyl-propyl |
| I-a-4 | n-propyl | n-propyl | n-propyl | n-propyl |
| I-a-5 | n-butyl | n-butyl | n-butyl | n-butyl |
| I-a-6 | Phenyl | Phenyl | Phenyl | Phenyl |
| I-a-7 | 4-ethyl-phenyl | 4-ethyl-phenyl | 4-ethyl-phenyl | 4-ethyl-phenyl |
| I-a-8 | 4-t-butyl-phenyl | 4-t-butyl-phenyl | 4-t-butyl-phenyl | 4-t-butyl-phenyl |
| I-a-9 | t-butyl | t-butyl | n-propyl | n-propyl |
| I-a-10 | t-butyl | t-butyl | i-propyl | i-propyl |

The compound represented by Formula (I) is synthesized, for example, according to the following reaction scheme.

(1) Compounds in which $R^{1a}$, $R^{1b}$, $R^{1c}$, and $R^{1d}$ are all the same group

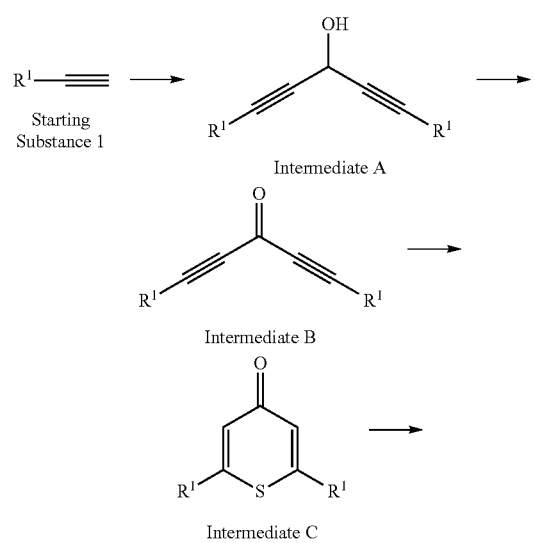

-continued

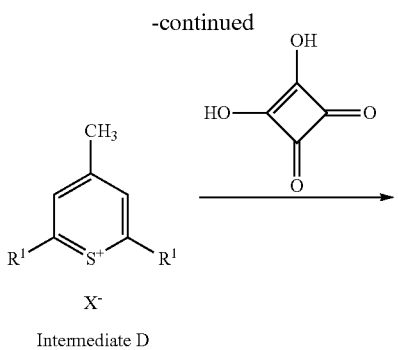

Intermediate D

Compound (I)-A

First, starting substance 1 is added dropwise to an organic solvent (for example, tetrahydrofuran, or the like) solution of organomagnesium halide (Grignard reagent, for example, ethylmagnesium chloride, or the like) under an inert atmosphere and cooling. Thereafter, in order to complete the reaction, the temperature may be returned to room temperature (for example, 20° C. to 25° C., the same applies in the following description) or higher. Subsequently, under cooling, a formic acid derivative (for example, ethyl formate, or the like) is added dropwise to act. Thereafter, in order to complete the reaction, the temperature may be returned to room temperature or higher than the room temperature. An organic matter is extracted from a mixture which has completed the reaction, and an intermediate A is obtained from a separated organic layer.

Subsequently, the intermediate A and an oxidizing reagent (for example, manganese oxide, or the like) are added to a solvent (for example, cyclohexane, or the like), and the mixture is reacted by heating under reflux. Water generated during the reaction may be removed. An intermediate B is obtained from the organic layer of the reaction mixture. Purification may be performed when obtaining the intermediate B.

Subsequently, a cycloaddition reaction is performed on the intermediate B. For example, sodium hydrogen sulfide n-hydrate is added to a solvent (for example, ethanol, or the like), and the intermediate B is added dropwise under cooling. Thereafter, the reaction is performed at room temperature, and the solvent is removed from the reaction solution. Thereafter, salt is added until the salt is saturated, the liquid is separated and the organic phase is recovered, and an intermediate C is obtained from the organic phase. Purification may be performed when the intermediate C is obtained.

Subsequently, in an inert atmosphere, a solvent (for example, anhydrous tetrahydrofuran, or the like) is mixed with the intermediate C and a Grignard reagent (for example, methylmagnesium bromide, or the like) is added dropwise. After completion of the dropwise addition, the reaction solution is heated to reflux. Subsequently, ammonium bromide is added dropwise with cooling. The separated organic layer is dried and concentrated to obtain an intermediate D.

Subsequently, the intermediate D and squaric acid are dispersed in a solvent (for example, a mixed solvent of cyclohexane and isobutanol, or the like) under an inert atmosphere, a basic compound (for example, pyridine, or the like) is added and heated under reflux to obtain a compound (I)-A. Water generated during the reaction may be removed. In addition, purification, isolation, concentration, and the like may be performed.

(2) Compound in which $R^{1a}$ and $R^{1d}$ are the same group and $R^{1b}$ and $R^{1c}$ are the same group ($R^{1a}$ and $R^{1b}$ are different groups)

The process of obtaining the intermediate A in the above reaction scheme (1) is changed to the following process.

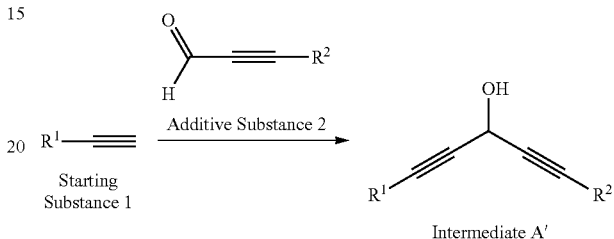

Starting Substance 1

Intermediate A'

In an inert atmosphere and under cooling, the starting substance 1 is added dropwise to a solution of a Grignard reagent (for example, ethylmagnesium bromide, or the like) in an organic solvent (for example, tetrahydrofuran, or the like), and then the additive substance 2 is added dropwise to react. A strong acid (for example, hydrochloric acid, or the like) is added to the solution after the reaction under cooling, and then ether is added at room temperature to obtain an intermediate A' from the organic layer. Purification may be performed when obtaining the intermediate A'.

(3) Compounds in which $R^{1a}$ and $R^{1b}$ are the same groups and $R^{1c}$ and $R^{1d}$ are the same groups ($R^{1a}$ and $R^{1c}$ are different groups)

As the intermediate D in the reaction scheme of the above (1), two types of compounds having different structures of $R^1$ are prepared, and the two types of compounds are reacted with a squaric acid to obtain the compound represented by Formula (I).

Compounds in which three of $R^{1a}$ to $R^{1d}$ are the same group, compounds of which two are the same groups and the remaining two are groups different from each other, and compounds of which four are different groups can also be synthesized according to the above reaction scheme.

—Compound Represented by Formula (II)—

Formula (II)

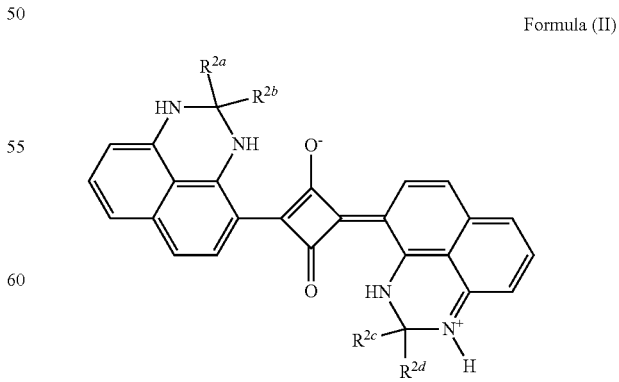

(In Formula (II), $R^{2a}$, $R^{2b}$, $R^{2c}$, and $R^{2d}$ each independently represent an alkyl group. $R^{2a}$, $R^{2b}$, $R^{2c}$, and $R^{2d}$ may be each independently linked to each other to form a ring.)

The alkyl group represented by $R^{2a}$, $R^{2b}$, $R^{2c}$, and $R^{2d}$ is preferably an alkyl group having 1 to 12 carbon atoms, and more preferably an alkyl group having 2 to 8 carbon atoms.

The alkyl group represented by $R^{2a}$, $R^{2b}$, $R^{2c}$, and $R^{2d}$ may be any of linear, branched or cyclic alkyl groups, and examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, an n-undecyl group, an isoundecyl group, an n-dodecyl group, an isododecyl group, a cyclopropyl group, a cyclopentyl group, a cyclohexyl group, and a bicyclo [2,2,2] octyl group, and the like.

In addition, in a case where $R^{2a}$ and $R^{2b}$ are linked to form a ring or $R^{2c}$ and $R^{2d}$ are linked to form a ring, the ring to be formed is preferably a 5-membered ring, a 6-membered ring, or a 7-membered ring, and more preferably a 6-membered ring.

The ring to be formed may have a substituent, and examples of the substituent include an alkyl group.

The group of a portion linking $R^{2c}$ and $R^{2d}$ is preferably an alkyl group having 3 or more and 6 or less carbon atoms.

Examples of the ring structure formed in a case of being linked to each other to form a ring include cyclopentane, cyclohexane, cycloheptane, 3,5-dimethylcyclohexane, 3,5-diethylcyclohexane, 3,5-diisopropylcyclohexane, 3,3,5-trimethylcyclohexane, 3,3,5,5-tetramethylcyclohexane, and the like.

The alkyl group represented by $R^{2a}$, $R^{2b}$, $R^c$, and $R^{2d}$ (including $R^{2a}$ and $R^{2b}$ and the ring formed by linking $R^{2c}$ and $R^{2d}$) may be substituted with a halogen atom (for example, fluorine and chlorine).

Specific examples of the compound (compounds (I-b-1) to (I-b-7)) represented by Formula (II), and specific examples of the compound (compounds (I-c-1) to (I-c-7)) in which $R^{2a}$, $R^{2b}$, $R^{2c}$, and $R^{2d}$ are linked to form a ring are shown in Formula (II) are shown in the following Tables 2 and 3.

TABLE 2

| NUMBER | $R^{2a}$ | $R^{2b}$ | $R^{2c}$ | $R^{2d}$ |
| --- | --- | --- | --- | --- |
| I-b-1 | i-propyl | i-propyl | i-propyl | i-propyl |
| I-b-2 | 2-methyl-propyl | 2-methyl-propyl | 2-methyl-propyl | 2-methyl-propyl |
| I-b-3 | n-butyl | n-butyl | n-butyl | n-butyl |
| I-b-4 | t-butyl | Methyl | t-butyl | Methyl |
| I-b-5 | n-butyl | Ethyl | n-butyl | Ethyl |
| I-b-6 | 2-methyl-propyl | Methyl | 2-methyl-propyl | Methyl |
| I-b-7 | n-nonyl | Methyl | n-nonyl | Methyl |

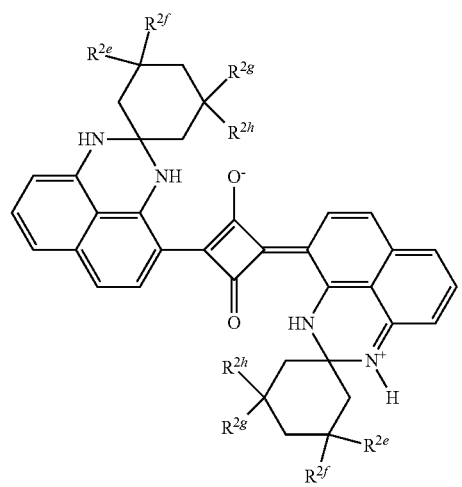

TABLE 3

| NUMBER | $R^{2e}$ | $R^{2f}$ | $R^{2g}$ | $R^{2h}$ |
| --- | --- | --- | --- | --- |
| I-c-1 | Methyl | Hydrogen | Hydrogen | Hydrogen |
| I-c-2 | Methyl | Hydrogen | Methyl | Hydrogen |
| I-c-3 | Methyl | Methyl | Hydrogen | Hydrogen |
| I-c-4 | Methyl | Methyl | Methyl | Hydrogen |
| I-c-5 | Methyl | Methyl | Methyl | Methyl |

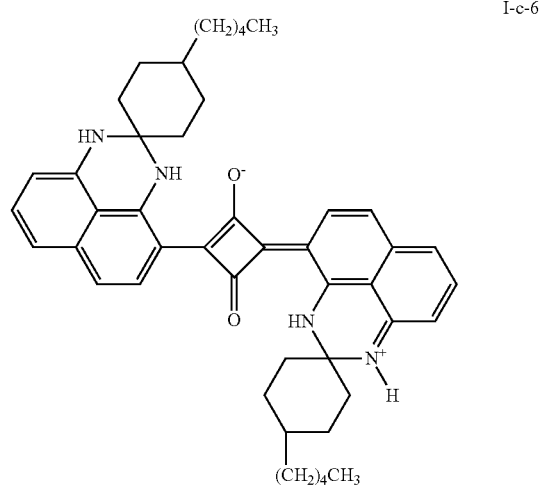

I-c-6

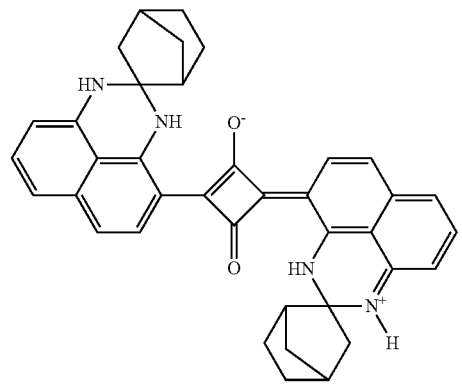

I-c-7

A maximum absorption wavelength ($\lambda_{max}$) in the tetrahydrofuran solution of the compound represented by Formula (I) and the compound represented by Formula (II) is preferably 760 nm or more and 1200 nm or less, more preferably 780 nm or more and 1100 nm or less, and still more preferably 800 nm or more and 1000 nm or less.

A molar absorption coefficient ($\varepsilon_{max}$) at the maximum absorption wavelength ($\lambda_{max}$) in the tetrahydrofuran solution of the compound represented by Formula (I) and the compound represented by Formula (II) is preferably $1 \times 10^5$ Lmol$^{-1}$cm$^{-1}$ or more and $6 \times 10^5$ Lmol$^{-1}$cm$^{-1}$ or less, more preferably $2.5 \times 10^5$ Lmol$^{-1}$cm$^{-1}$ or more and $6 \times 10^5$ Lmol$^{-1}$cm$^{-1}$ or less, and still more preferably $2.5 \times 10^5$ Lmol$^{-1}$cm$^{-1}$ or more and $6 \times 10^5$ Lmol$^{-1}$cm$^{-1}$ or less.

Other Compounds Having Infrared Absorptivity

The particles may contain other compounds having infrared absorptivity other than the compounds represented by Formula (I) and the compound represented by Formula (II). However, from the viewpoint of infrared absorption performance, the content of the other compounds having the infrared absorptivity is preferably 20% by mass or less, more preferably 10% by mass or less, and further preferably not contained with respect to 100 parts by mass of the entire compounds (including the compounds represented by Formula (I) and the compound represented by Formula (II)) having the infrared absorptivity and contained in the particles.

As other compounds having the infrared absorptivity, known compounds having the infrared absorptivity in the related art can be mentioned, and examples thereof include cyanine compounds, aminium compounds, or the like.

[Specific Resin]

The particles contained in the particle dispersion liquid according to the present embodiment contain the polymer (specific resin) having the alkyl (meth) acrylate as the structural unit, the alkyl (meth) acrylate containing the alicyclic hydrocarbon group having the bridged bond (bridged alicyclic group). The polymer has an acid value ranging from 6 mgKOH/g to 100 mgKOH/g.

The specific resin is obtained by polymerizing the alkyl (meth) acrylate containing the alicyclic hydrocarbon group having the bridged bond (bridged alicyclic group), as at least one of the monomers.

Alkyl (Meth) Acrylate Containing the Alicyclic Hydrocarbon Group Having the Bridged Bond Examples of the alkyl (meth) acrylate containing the alicyclic hydrocarbon group having the bridged bond (bridged alicyclic group) include a compound represented by Formula (A1) and a compound represented by Formula (A2).

H$_2$C=CH—C(=O)—O—(R$^{41}$)$_n$—R$^{42}$    Formula (A1)

H$_2$C=C(—CH$_3$)—C(=O)—O—(R$^{41}$)$_n$—R$^{42}$    Formula (A2)

In Formulas (A1) and (A2), R$^{41}$ represents the alkyl group, R$^{42}$ represents the alicyclic hydrocarbon group having the bridged bond (bridged alicyclic group), and n represents 0 or 1.

Here, the alicyclic hydrocarbon group (bridged alicyclic group) having a bridged bond means a group having a structure in which two non-adjacent carbon atoms (or a hetero atom) configuring a ring in a 4-membered or more alicyclic structure (cycloaliphatic structure) are linked by a single bond or a bond via an organic group.

Examples of the ring structure in the alicyclic hydrocarbon group having the bridged bond (bridged alicyclic group) include a bicyclic structure (bicyclo ring structure), a tricyclic structure (tricyclo ring structure), a multicyclic structure having tetracyclic or more, and the like. Among these, the bicyclic structure (bicyclo ring structure) or the tricyclic structure (tricyclo ring structure) is preferable.

In addition, the bridged alicyclic group may be an unsubstituted group or a substituted group. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, a cyano group, and the like.

From the viewpoint of viscosity and solubility, the number of carbon atoms in the bridged alicyclic group (including the substituent in a case of having the substituent) is preferably 8 or more and 20 or less.

Examples of the alicyclic hydrocarbon group having the bridged bond (bridged alicyclic group) include the following groups.

(1) Bicyclohexyl group (bicyclo [2.1.1] hexyl group)

(2) Norbornyl group (bicyclo [2.2.1] heptyl group)

(3) Isobornyl group (1,7,7-trimethyl-bicyclo [2.2.1] heptyl group)

(4) Dicyclopentanyl group (tricyclo [5.2.1.0 (2,6)] decanyl group)

(5) Dicyclopentenyl group (tricyclo [5.2.1.0 (2,6)] deca-3-enyl group)

(6) Adamantyl group (tricyclo [3.3.1.1 (3,7)] decanyl group)

(7) Bicyclo [4.3.0] nonyl group

(1)

(2)

(3)

(4)

(5)

(6)

(7)

Specific examples of the alkyl (meth) acrylate containing the alicyclic hydrocarbon group having the bridged bond (bridged alicyclic group) include the following compounds.

(1m) Isobornyl methacrylate
(2m) Dicyclopentanyl methacrylate
(3m) 2-methyl-2-adamantyl methacrylate
(4m) 2-ethyl-2-adamantyl methacrylate
(5m) 3-hydroxy-1-adamantyl methacrylate
(6m) Dicyclopentenyl methacrylate
(7m) Dicyclopentenyloxyethyl methacrylate
(1a) Isobornyl acrylate
(2a) Dicyclopentanyl acrylate
(3a) 2-methyl-2-adamantyl acrylate
(4a) 2-ethyl-2-adamantyl acrylate
(5a) 3-hydroxy-1-adamantyl acrylate
(6a) Dicyclopentenyl acrylate
(7a) Dicyclopentenyloxyethyl acrylate (1m) 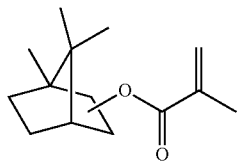

(2m) 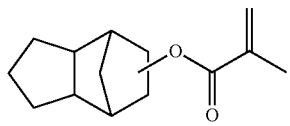

(3m) 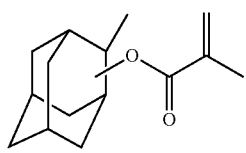

(4m) 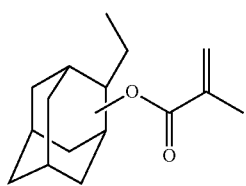

(5m) 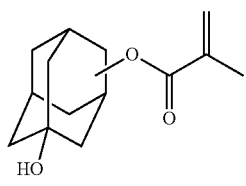

(6m) 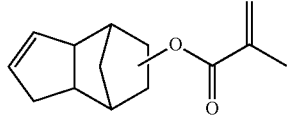

(7m) 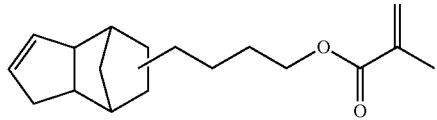

The proportion of the alkyl (meth) acrylate containing the bridged alicyclic group in the total monomer to be used as the raw material for the specific resin is preferably adjusted so that the content of the alicyclic hydrocarbon group having the bridged bond (bridged alicyclic group) is within the following range.

The average content of the alicyclic hydrocarbon group having the bridged bond (bridged alicyclic group) in a molecular structure of the specific resin is preferably 7% by mass or more and 50% by mass or less, more preferably 12% by mass or more and 40% by mass or less, and further preferably 12% by mass or more and 35% by mass or less.

When the average content of the bridged alicyclic groups is 7% by mass or more, the concentration redispersibility is more easily improved and the infrared absorption performance is more easily improved. On the other hand, when the average content of the bridged alicyclic groups is 50% by mass or less, it is preferable from the viewpoint that preparation of a resin dispersion liquid can be easily performed while suppressing deterioration in solubility of the resin in an organic solvent.

The average content of the bridged alicyclic groups is measured by the following method.

In a case where the particle dispersion liquid or the aqueous ink contains a pigment, the pigment dispersion is removed by centrifugation or filtration and neutralized until acidic with hydrochloric acid. The obtained solid is recovered, washed with water, methanol, or the like, and dried to recover the resin. The monomer structure and the copolymerization ratio of the resin are determined by the thermal decomposition Gas Chromatography-Mass spectrometry (GC-MS) and proton nuclear magnetic resonance (NMR), and are determined from the content of the bridged alicyclic groups/resin mass.

For example, in a case of isobornyl methacrylate/methyl methacrylate/acrylic acid copolymer (mass ratio of each monomer 45/47/8), since the mass of the isobornyl group accounts for 61.7% of isobornyl methacrylate, 45×0.617/100 is 27.8.

Monomer Having a Group which Imparts an Acid Value

In addition, it is preferable that the specific resin has a structural unit imparting an acid value. That is, it is preferable that the specific resin is a resin obtained by polymerizing a monomer having a group that imparts an acid value as one type of monomer, in addition to the alkyl (meth) acrylate containing the alicyclic hydrocarbon group having the bridged bond (bridged alicyclic group).

Examples of the monomer having the group that imparts an acid value include a carboxy group-containing monomer, a sulfo group-containing monomer, a phosphate group-containing monomer, or the like.

Examples of the carboxy group-containing monomer include acrylic acid, methacrylic acid, itaconic acid, maleic acid, fumaric acid, citraconic acid, crotonic acid, itaconic acid monoalkyl ester (for example, itaconic acid monomethyl, itaconic acid monoethyl, itaconic acid monobutyl, and the like), maleic acid monoalkyl ester (for example, maleic acid monomethyl, maleic acid monoethyl, maleic acid monobutyl, and the like), 2-carboxyethyl (meth) acrylate, styrene carboxylic acid, and the like. As the carboxy group-containing monomer, acrylic acid, methacrylic acid, and 2-carboxyethyl acrylate are preferable, and 2-carboxyethyl acrylate is particularly preferable.

Examples of the sulfo group-containing monomer include (meth) acryloyloxyalkylsulfonic acid (for example, (meth) acryloyloxymethanesulfonic acid, (meth) acryloyloxyethanesulfonic acid, (meth) acryloyloxypropanesulfonic acid, and the like), acrylamido alkyl sulfonic acid (for example, 2-acrylamido-2-methylethane sulfonic acid, 2-acrylamido-2-methylpropanesulfonic acid, 2-acrylamido-2-methylbutanesulfonic acid, and the like), methacrylamidoalkylsulfonic acid (for example, 2-methacryloylamido-2-methylethanesulfonic acid, 2-methacrylamido-2- methylpropanesulfonic acid, 2-methacrylamido-2-methylbutanesulfonic acid, and the like), styrene sulfonic acid, vinyl benzyl sulfonic acid, and the like. As the sulfo group-containing monomer, styrene sulfonic acid and 2-acrylamide-2-methylpropanesulfonic acid are preferable.

Examples of the phosphate group-containing monomer include mono 2-(meth) acryloyloxyethyl phosphate, monovinyl phosphate, and the like.

The monomer having a group that imparts an acid value may be used alone, or two or more types thereof may be used in combination.

The proportion of the monomer having the group imparting an acid value in the total monomer to be used as the raw material for the specific resin is preferably adjusted so that an acid value is within the following range.

Other Monomers

In addition, the specific resin may have other structural unit as a structural unit, in addition to the alkyl (meth) acrylate containing the alicyclic hydrocarbon group having the bridged bond (bridged alicyclic group) and a structural unit imparting an acid value. That is, the specific resin may be a resin obtained by polymerizing other monomers as one type of monomer, in addition to the alkyl (meth) acrylates containing the alicyclic hydrocarbon group having the bridged bond (bridged alicyclic group). The other monomers may have the group which imparts an acid value.

The other monomer is not particularly limited as long as the other monomer is a monomer copolymerizable with the alkyl (meth) acrylate containing the bridged alicyclic group.

Examples of the other monomers include the following monomers:

Examples of the alkyl (meth) acrylate including methyl (meth) acrylate, ethyl (meth) acrylate, n-propyl (meth) acrylate, isopropyl (meth) acrylate, n-butyl (meth) acrylate, isobutyl butyl (meth) acrylate, sec-butyl (meth) acrylate, tert-butyl (meth) acrylate, hexyl (meth) acrylate, 2-ethylhexyl (meth) acrylate, octyl (meth) acrylate, and the like;

Examples of (meth) acrylate other than alkyl group or substituted alkyl group, including furfuryl (meth) acrylate, tetrahydrofurfuryl (meth) acrylate, 2-methoxyethyl (meth) acrylate, glycidyl (meth) acrylate, 2,2,2-tetrafluoroethyl (meth) acrylate, phenyl (meth) acrylate, naphthyl (meth) acrylate, phenoxyethyl (meth) acrylate, benzyl (meth) acrylate, 3-phenoxy-2-hydroxy-propyl (meth) acrylate, 2-methoxyethyl (meth) acrylate, 2-(2-methoxyethoxy) ethyl (meth) acrylate, 2-(2-methoxyethoxy) ethyl (meth) acrylate, ethoxytriethylene glycol (meth) acrylate, an ethylenically unsaturated monomer containing a (poly) ethyleneoxy group or polypropyleneoxy group such as methoxy polyethylene glycol (for example, one having a weight average molecular weight of 200 to 1000) mono (meth) acrylate, polyethylene glycol (for example, having a weight average molecular weight of 200 to 1000) mono (meth) acrylate, 2-hydroxyethyl (meth) acrylate, 2-hydroxypropyl (meth) acrylate, 4-hydroxybutyl (meth) acrylate, hydroxypentyl (meth) acrylate, hydroxyhexyl (meth) acrylate, 2,2-dimethyl-3-hydroxypropyl (meth) acrylate, and the like;

Examples of the styrenes including styrene, substituted styrene (such as α-methylstyrene, dimethylstyrene, trimethylstyrene, ethylstyrene, isopropylstyrene, chloromethylstyrene, methoxystyrene, acetoxystyrene, chlorostyrene, dichloro styrene, bromostyrene, vinylbenzoic acid methyl ester), styrene macromer having polystyrene structural unit, and the like;

Examples of the vinyl esters including vinyl acetate, vinyl propionate, vinyl butyrate, vinyl isobutyrate, vinyl caproate, vinyl chloroacetate, vinyl methoxy acetate, vinyl phenyl acetate, vinyl benzoate, vinyl salicylate, and the like;

Examples of acrylamides including acrylamide, methylacrylamide, ethylacrylamide, propyl acrylamide, butyl acrylamide, tert-butyl acrylamide, tert-octyl acrylamide, cyclohexyl acrylamide, benzyl acrylamide, hydroxymethyl acrylamide, methoxymethyl acrylamide, butoxymethyl acrylamide, methoxyethyl acrylamide, phenyl acrylamide, dimethyl acrylamide, diethyl acrylamide, β-cyanoethyl acrylamide, N-(2-acetoacetoxyethyl) acrylamide, diacetone acrylamide, and the like;

Examples of methacrylamides including methacrylamide, methyl methacrylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, phenyl methacrylamide, dimethyl methacrylamide, β-cyanoethyl methacrylamide, N-(2-acetoacetoxyethyl) methacrylamide, and the like;

Examples of the olefins including dicyclopentadiene, ethylene, propylene, 1-butene, 1-pentene, vinyl chloride, vinylidene chloride, isoprene, chloroprene, butadiene, 2,3-dimethylbutadiene, and the like;

Examples of the vinyl ethers including methyl vinyl ether, butyl vinyl ether, hexyl vinyl ether, methoxyethyl vinyl ether, and the like; and Examples of the other monomers including butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyl oxazolidone, N-vinyl pyrrolidone, vinylidene chloride, methylene malononitrile, and the like.

Specific Examples

Hereinafter, exemplified compounds P01 to P20 and P41 to P47 are listed as specific examples of the specific resin. However, the specific resin in the present embodiment is not limited thereto. An example of the mass ratio of the copolymerization component is shown in parentheses.

P01: Isobornyl methacrylate/methyl methacrylate/acrylic acid-2-carboxyethyl copolymer (45/49/6)

P02: Isobornyl methacrylate/phenoxyethyl methacrylate/methacrylic acid/acrylic acid-2-carboxyethyl copolymer (30/50/14/6)

P03: Isobornyl methacrylate/ethyl methacrylate/styrene carboxylic acid/acrylic acid-2-carboxyethyl copolymer (50/40/2/8)

P04: Isobornyl methacrylate/isobutyl methacrylate/2-acrylamide-2-methylpropanesulfonic acid/acrylic acid-2-carboxyethyl copolymer (50/45/2/3)

P05: Isobornyl methacrylate/styrene/phenoxyethyl methacrylate/methyl methacrylate/acrylic acid-2-carboxyethyl copolymer (30/30/20/15/5)

P06: Isobornyl methacrylate/ethyl acrylate/acrylic acid-2-carboxyethyl copolymer (80/14/6)

P07: Isobornyl methacrylate/butyl acrylate/ethyl methacrylate/acrylic acid-2-carboxyethyl copolymer (30/15/45/10)

P08: Isobornyl methacrylate/styrene/methyl methacrylate/tetrahydrofurfuryl methacrylate/acrylic acid-2-carboxyethyl copolymer (30/20/25/20/5)

P09: Isobornyl methacrylate/dicyclopentenyloxyethyl methacrylate/methyl methacrylate/acrylic acid-2-carboxyethyl copolymer (30/20/45/5)

P10: Isobornyl methacrylate/4-t-butylstyrene/isobutyl methacrylate/acrylic acid-2-carboxyethyl copolymer (50/10/30/10)

P11: Dicyclopentanyl methacrylate/styrene/methyl methacrylate/acrylic acid-2-carboxyethyl copolymer (30/20/44/6)

P12: Dicyclopentanyl methacrylate/ethyl methacrylate/acrylic acid-2-carboxyethyl copolymer (50/45/5)

P13: Dicyclopentanyl methacrylate/methyl methacrylate/methacrylic acid/acrylic acid-2-carboxyethyl copolymer (45/48/3/4)

P14: Dicyclopentanyl methacrylate/isobornyl methacrylate/methyl methacrylate/phosphoric acid mono 2-(meth)acryloylethyl/acrylic acid-2-carboxyethyl copolymer (32/20/40/4/4)

P15: Dicyclopentenyl acrylate/ethyl acrylate/acrylic acid-2-carboxyethyl copolymer (50/40/10)

P16: Dicyclopentenyl acrylate/methyl methacrylate/ethoxytriethylene glycol methacrylate/acrylic acid-2-carboxyethyl copolymer (60/15/15/10)

P17: Dicyclopentenyl acrylate/styrene/methyl methacrylate/acrylic acid-2-carboxyethyl copolymer (40/15/39/6)

P18: Dicyclopentenyloxyethyl acrylate/methyl methacrylate/hexyl acrylate/acrylic acid-2-carboxyethyl copolymer (40/40/5/15)

P19: Dicyclopentenyloxyethyl acrylate/ethyl methacrylate/styrene/acrylic acid-2-carboxyethyl copolymer (30/45/15/10)

P20: Dicyclopentanyl acrylate/isobornyl methacrylate/methyl methacrylate/acrylic acid-2-carboxyethyl copolymer (40/10/40/10)

P40: Isobornyl methacrylate/methyl methacrylate/acrylic acid copolymer (45/47/8)

P41: Isobornyl methacrylate/styrene/methyl methacrylate/methacrylic acid copolymer (30/20/42/8)

P42: Isobornyl methacrylate/ethyl methacrylate/styrene carboxylic acid copolymer (50/47/3)

P43: Isobornyl methacrylate/methyl methacrylate/2-acrylamide-2-methylpropanesulfonic acid copolymer (42/54/4)

P44: Dicyclopentanyl methacrylate/styrene/methyl methacrylate/2-acrylamide-2-methylpropanesulfonic acid copolymer (30/20/46/4)

P45: Dicyclopentanyl methacrylate/phenoxyethyl methacrylate/isobutyl methacrylate/styrene carboxylic acid copolymer (30/35/25/10)

P46: Dicyclopentanyl methacrylate/ethyl methacrylate/phosphoric acid mono-2-methacryloyloxyethyl copolymer (30/60/10)

P47: Dicyclopentenyl acrylate/ethyl methacrylate/sodium styrenesulfonate copolymer (50/47/3)

Physical Properties of Specific Resin

The specific resin has an acid value ranging from 6 mgKOH/g to 100 mgKOH/g. When the acid value is 6 mgKOH/g or more, the dispersibility of the specific resin in the aqueous medium is not too low relatively, and the dispersion stability of the particles is enhanced. On the other hand, when the acid value is 100 mgKOH/g or less, the water solubility of the specific resin is not too high relatively, the formation property of the particles containing the specific resin and the compound represented by Formula (I) and the compound (specific compound) represented by Formula (II) is enhanced, and the particles stably dispersed in the aqueous medium are obtained.

From these viewpoints, the acid value of the specific resin preferably ranges from 7 mgKOH/g to 80 mgKOH/g, and more preferably ranges from 8 mgKOH/g to 60 mgKOH/g.

In the present embodiment, the acid value of the specific resin is a value determined by a neutralization titration method defined in JIS K0070: 1992.

The weight average molecular weight of the specific resin preferably ranges from 3,000 to 200,000, more preferably ranges from 5,000 to 150,000, and still more preferably ranges from 10,000 to 100,000. When the weight average molecular weight is 3000 or more, the content proportion of the water-soluble component described later is reduced, which is suitable for dispersing the specific compound (compound represented by Formula (I) and compound represented by Formula (II)). On the other hand, when the weight average molecular weight is 200,000 or less, solubility in an organic solvent is excellent and viscosity of a polymer solution dissolved in the organic solvent is suppressed. Therefore, in preparing the particle dispersion liquid, it is easy to disperse in the aqueous medium, so that the dispersion stability of the particles is excellent.

The weight average molecular weight of the resin is measured by Gel Permeation Chromatography (GPC) and calculated in terms of polystyrene.

A glass transition temperature of the specific resin preferably ranges from 40° C. to 150° C. When the glass transition temperature is 40° C. or higher, an image formed using an ink containing the specific resin is excellent in scratch resistance and blocking resistance. When the glass transition temperature is 150° C. or lower, the image formed using the ink containing the specific resin is excellent in abrasion resistance. From this viewpoint, the glass transition temperature of the specific resin more preferably ranges from 60° C. to 140° C., and still more preferably ranges from 70° C. to 130° C.

When a specific resin is used as the resin dispersion liquid, the proportion of the water-soluble component to the solid content contained in the dispersion liquid is preferably 10% by mass or less.

Normally, each molecule configuring the aggregate of the resin has variations in the composition of the structural units, and therefore, each molecule has variations in the solubility in water. A resin molecule having a relatively high solubility in water corresponds to the "water-soluble component" referred to herein. In the water-soluble component, that is, the resin molecule having relatively high solubility in water, the dispersibility of the specific compound (compound represented by Formula (I) and compound represented by Formula (II)) is likely to be relatively low. Therefore, when the specific resin is used as the resin dispersion liquid, the water-soluble component contained in the dispersion liquid is preferably as small as possible. In addition, from the viewpoint of suppressing the swelling of the particles containing the specific resin and the adhesion between the particles and maintaining the stable dispersion, when the specific resin is used as the resin dispersion liquid, the water-soluble component contained in the dispersion liquid is preferably as small as possible. From these viewpoints, when the specific resin is used as the dispersion liquid, the proportion of the water-soluble component to the solid content amount contained in the dispersion liquid is preferably 10% by mass or less, more preferably 8% by mass or less, still more preferably 5% by mass or less, and preferably as small as possible.

The proportion of the water-soluble component is measured by the following method.

A resin dispersion liquid (solid content concentration: 10% by mass, liquid temperature: 23±0.5° C.) in which the resin is dispersed in water is prepared. At that time, a neutralizing agent is used as necessary for dispersion of the resin. The resin dispersion liquid is centrifuged on a dispersoid and a medium using a centrifugal ultrafiltration filter unit, the separated medium is dried to measure the mass of the dry matter. The proportion of the amount of dry matter of the medium to the solid content of the resin dispersion liquid (=amount of resin used for preparing resin dispersion liquid+mass of neutralizing agent used in preparing process of resin dispersion liquid) is calculated, and the proportion is defined as the proportion (% by mass) of the water-soluble component.

Other Resin

In the present embodiment, as the resin contained in the particles, a resin other than the specific resin may be used in combination. Examples of the resins other than the specific resin include known resins such as polyester, polyurethane, polyamide, polyurea, and polycarbonate.

However, it is preferable that the specific resin among the total resin contained in the particles is the main resin, and it is preferable that the specific resin among the total resin is the resin having the largest mass. Specifically, the mass ratio of the specific resin in the total resin is preferably more than 50% by mass, more preferably 80% by mass or more, further preferably 90% by mass or more, and particularly preferably 100% by mass.

[Aqueous Medium]

The medium of the particle dispersion liquid is water or a mixed solvent containing water as a main solvent. The mixed solvent is, for example, a mixture of water and a water-soluble organic solvent.

As water, purified water such as distilled water, ion-exchanged water, and ultrafiltered water is preferable from the viewpoint of suppressing contamination of impurities or generation of microorganisms.

Examples of the water-soluble organic solvent include alcohol, polyhydric alcohol, a polyhydric alcohol derivative, nitrogen-containing solvent, and sulfur-containing solvent. The water-soluble organic solvent contained in the particle dispersion liquid is, for example, a compound represented by Formula (1) or a residue of the organic solvent used for dissolving the specific polyester in the process of preparing the particle dispersion liquid.

The content of water is preferably 50% by mass or more and 95% by mass or less, and more preferably 60% by mass or more and 90% by mass or less with respect to the total mass of the particle dispersion liquid.

The content of the water-soluble organic solvent is preferably 30% by mass or less, and more preferably 10% by mass or less with respect to the total mass of the particle dispersion liquid.

[Other Components]

The particle dispersion liquid according to the present embodiment may contain a compound (for example, squarylium type coloring matter, croconium type coloring matter, naphthalocyanine type coloring matter, cyanine type coloring matter, aminium type coloring matter, and the like) other than a specific compound (compound represented by Formula (I) and compound represented by Formula (II)), a compound (for example, benzotriazole-based compound, benzophenone-based compound, and the like) having ultraviolet absorption capacity, a coloring agent, a neutralizing agent, a surfactant, a dispersion stabilizer, a polymer other than a specific polyester, and the like.

Second Embodiment

<Particle Dispersion Liquid>

The particle dispersion liquid according to the embodiment is a dispersion liquid containing an aqueous medium and particles dispersed in the aqueous medium.

The particle contains at least one compound represented by Formula (I) or Formula (II) (that is, including at least one of the compound represented by Formula (I) and the compound represented by Formula (II)). In addition, the particle includes a polyester resin containing a unit represented by Formula (F1). The content of the unit represented by Formula (F1) in the polyester resin is 20% by mass or more.

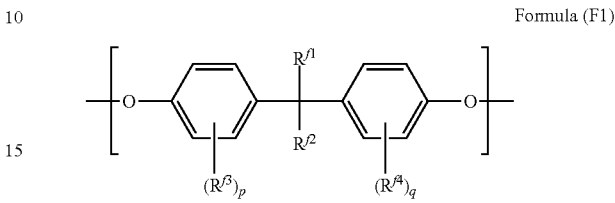

Formula (F1)

(In Formula (F1), $R^{f1}$ and $R^{f2}$ each independently represent hydrogen or a methyl group, $R^{f3}$ and $R^{f4}$ each represent a methyl group, and p and q each independently represents 0 or 1.)

In a case where a particle dispersion liquid is used as, for example, an aqueous ink or the like, when a compound having a squarylium skeleton such as the compound represented by Formula (I) or Formula (II) is used as the organic compound in the particle, it has been found that a phenomenon occurs in which at least one aggregate of the compound represented by Formula (I) or Formula (II) is precipitated out of the particles. In a case where the particle dispersion liquid is used as the aqueous ink, precipitated aggregates causes deterioration of ink ejection performance such as clogging of nozzles, and leads to deterioration of coating performance, deterioration of image smoothness and the like in some cases.

On the other hand, the particle dispersion liquid according to the embodiment contains the particle containing at least one compound represented by Formula (I) or Formula (II), and contains a polyester resin (hereinafter referred to as "specific polyester resin") containing 20% by mass or more of the unit represented by Formula (F1) as a content in the molecular structure. Therefore, precipitation of at least one compound represented by Formula (I) or Formula (II) is suppressed.

The reason for this is presumed as follows.

The unit represented by Formula (F1) contains a plurality of aromatic rings as the squarylium skeleton of the compound represented by Formula (I) or Formula (II), and both have similar chemical structures. Therefore, it is considered that the specific polyester resin containing the unit represented by Formula (F1) in the above content has a high affinity with the compound represented by Formula (I) or Formula (II). As a result, in the particles using the specific polyester resin as a matrix resin, the compound represented by Formula (I) or Formula (II) exhibits excellent solubility (molecular dispersion state), and exists in a state where the aggregation is suppressed. Even after being stored in a state of the dispersion liquid (for example, state of aqueous ink), the compound represented by Formula (I) or Formula (II) is prevented from aggregating due to the influence of the above affinity. As a result, it is considered that precipitation of the compound represented by Formula (I) or Formula (II) is suppressed.

As described above, in the embodiment, the precipitation of the compound represented by Formula (I) or Formula (II) is suppressed.

In addition, as a result, in a case where the particle dispersion liquid according to the embodiment is used as the aqueous ink, the deterioration of the ink ejection performance such as clogging of nozzles is suppressed, and occurrence of the deterioration of the coating performance and the deterioration of the image smoothness is suppressed.

In addition, in the present embodiment, in a case where the compound represented by Formula (I) or Formula (II) has infrared absorption performance, it is more excellent in infrared absorption performance. It is considered that the compounds represented by Formula (I) or Formula (II) are satisfactorily dispersed in the particles and exist in a state where the occurrence of aggregation is suppressed, so that the infrared absorption performance is efficiently exhibited.

In addition, in the embodiment, the yield of particles is further enhanced. It is considered that the particles are excellent in dispersion stability in the aqueous medium, so that aggregates of particles are unlikely to occur in the process of preparing the particle dispersion liquid.

Furthermore, according to the present embodiment, the dispersion liquid in which particles having a small particle diameter (for example, volume average particle diameter of 150 nm or less) are dispersed is obtained.

In the present embodiment, the dispersion state of the particles may be emulsification in which liquid particles are dispersed, or suspension in which solid particles are dispersed, and from the viewpoint of dispersion stability, the suspension in which the solid particles are dispersed is preferable. That is, the particle dispersion liquid according to the present embodiment may be an emulsion in which the particles are dispersed in the aqueous medium in a liquid state, or a suspension in which the particles are dispersed in the aqueous medium in a solid state, and from the viewpoint of dispersion stability of the particles, it is preferable to be the suspension.

—Content of Unit represented by Formula (F1)—In the present embodiment, the content of the unit represented by Formula (F1) in the molecular structure of the specific polyester resin is 20% by mass or more. When the above content is 20% by mass or more, precipitation of the compound represented by Formula (I) or Formula (II) is suppressed.

The above content is preferably 25% by mass or more, and more preferably 30% by mass or more.

On the other hand, the unit represented by Formula (F1) may be contained to the extent that the unit can be contained in the molecular structure of the specific polyester resin. However, since the unit represented by Formula (F1) can normally be contained in the molecular structure of the specific polyester resin by polymerization as a diol component, from this viewpoint, for example, the upper limit of the content of the unit represented by Formula (F1) in the molecular structure of the specific polyester resin can be 45% by mass or less, is preferably 43% by mass or less, and more preferably 40% by mass or less.

Here, the content of the unit represented by Formula (F1) in the molecular structure of the specific polyester resin means an average value of the mass ratio of the unit represented by Formula (F1) contained in the specific polyester resin with respect to the specific polyester resin. For example, the molecular weight of the unit represented by Formula (F2) described later (sum of atomic weights of the atoms configuring the structural unit) is 194. For example, in a case where 30 g of the unit represented by Formula (F1) is contained in 100 g of the resin, the content is 30% by mass.

Here, a method of measuring the content of the unit represented by Formula (F1) in the molecular structure of the specific polyester resin will be described.

In a case where the particle dispersion liquid or the aqueous ink contains a pigment, the pigment dispersion is removed by centrifugation or filtration and neutralized until acidic with hydrochloric acid. The obtained solid is recovered, washed with water, methanol, or the like, and dried to recover the resin. The resin is analyzed by nuclear magnetic resonance (NMR), Fourier Transform Infrared (FT-IR) Spectroscopy, and the reaction thermal decomposition Gas Chromatography-Mass Spectrometry (GC-MS) method, the type and the molar ratio of monomer are determined, and are determined from content of the unit represented by Formula (F1)/resin mass.

Hereinafter, the components, composition, preparation method and the like of the particle dispersion liquid according to the embodiment will be described in detail.

[Specific Compound]

The particles contained in the particle dispersion liquid according to the present embodiment contain the same specific compound as in the first embodiment. The particles may contain other compounds having the infrared absorptivity similar to those of the first embodiment.

[Specific Polyester Resin]

The specific polyester resin in the present embodiment contains a unit represented by Formula (F1) in the molecular structure, and the content thereof is 20% by mass or more.

Unit Represented by Formula (F1)

Examples of a method of including the unit represented by Formula (F1) in the molecular structure of the specific polyester resin include a method of polymerizing (dehydration condensation) a monomer having a unit represented by Formula (F1) as a raw material (monomer) of the specific polyester resin.

Generally, a polyester resin is synthesized by dehydration condensation of a dicarboxylic acid and a diol. Normally, the unit represented by Formula (F1) can be contained in the molecular structure of the specific polyester resin by polymerization (dehydration condensation) as a diol component.

Examples of the diol which is the monomer having the structure to be the unit represented by Formula (F1) include bisphenol A (2,2-bis(4-hydroxyphenyl) propane), bisphenol B (2,2-bis(4-hydroxyphenyl) butane), bisphenol C (2,2-bis (3-methyl-4-hydroxyphenyl) propane), bisphenol E (1,1-bis (4-hydroxyphenyl) ethane), bisphenol F (bis(4-hydroxyphenyl) methane), ethylene oxide adducts and propylene oxide adducts thereof, and the like.

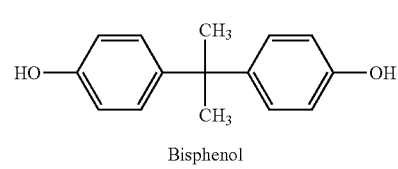

Bisphenol

A

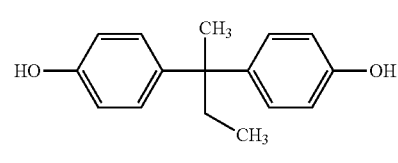

Bisphenol

B

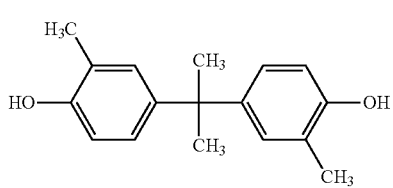

Bisphenol C

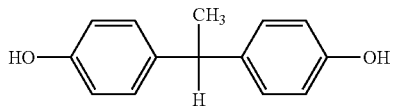

Bisphenol E

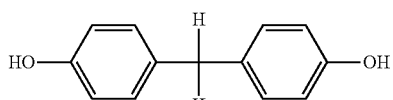

Bisphenol F

The unit represented by Formula (F1) is preferably a unit represented by Formula (F2).

That is, as the diol, bisphenol A and the adduct of at least one of ethylene oxide and propylene oxide thereof are more preferably used.

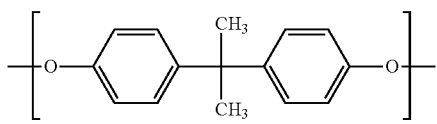

Formula (F2)

The content of the unit represented by Formula (F2) in the specific polyester resin can be controlled by adjusting the proportion (mass ratio) used for the polymerization (dehydration condensation).

Other Raw Materials (Monomer)

From the viewpoint of dispersibility in the aqueous medium, the specific polyester resin preferably has a dissociative group. As the dissociable group, an anionic group is preferable, and a carboxy group and a sulfonic acid group are particularly preferable. An introduction of the dissociable group into the specific polyester resin is performed, for example, by using a dicarboxylic acid or a diol having a sulfonic acid group as a raw material of the dehydration condensation.

Examples of the dicarboxylic acid having the sulfonic acid group include 3-sulfophthalic acid, 4-sulfophthalic acid, 4-sulfoisophthalic acid, 5-sulfoisophthalic acid, 2-sulfoterephthalic acid, sulfosuccinic acid, 4-sulfo-1,8-naphthalenedicarboxylic acid, 7-sulfo-1,5-naphthalenedicarboxylic acid, 2,4-di(2-hydroxy) ethyloxycarbonylbenzenesulfonic acid, salts thereof, and the like. These dicarboxylic acids may be used alone, or two types or more thereof may be used in combination.

Examples of other dicarboxylic acids include oxalic acid, malonic acid, succinic acid, glutaric acid, dimethylmalonic acid, adipic acid, pimelic acid, α,α-dimethylsuccinic acid, acetone dicarboxylic acid, sebacic acid, 1,9-nonanedicarboxylic acid, fumaric acid, maleic acid, itaconic acid, citraconic acid, phthalic acid, isophthalic acid, terephthalic acid, 2-butyl terephthalic acid, tetrachloroterephthalic acid, acetylene dicarboxylic acid, poly(ethylene terephthalate) dicarboxylic acid, 1,2-cyclohexanedicarboxylic acid, 1,4-cyclohexanedicarboxylic acid, ω-poly(ethylene oxide) dicarboxylic acid, p-xylylenedicarboxylic acid, and the like. These dicarboxylic acids may be subjected to dehydration condensation in the form of alkyl esters, acid chlorides or acid anhydrides. These dicarboxylic acids may be used alone, or two types or more thereof may be used in combination.

The specific polyester resin is preferably a polymer obtained by polymerizing (condensing) a dicarboxylic acid compound having an aromatic ring in the molecular structure as a dicarboxylic acid component. The aromatic ring is contained in the structural unit derived from the dicarboxylic acid, so that it is considered that the affinity of the compound represented by Formula (I) or Formula (II) is enhanced, and the precipitation of the compound represented by Formula (I) or Formula (II) is likely to be suppressed.

Examples of the diol having a dissociative group include 2,2-bis(hydroxymethyl) propionic acid, 2,2-bis(hydroxymethyl) butanoic acid, 2,5,6-trimethoxy-3,4-dihydroxyhexanoic acid, 2,3-dihydroxy-4,5-dimethoxypentanoic acid, 2,4-di(2-hydroxy) ethyloxycarbonylbenzenesulfonic acid, salts thereof, and the like. The diol having the dissociative group may be used alone, or two types or more thereof may be used in combination.

Examples of the diol having no dissociative group include ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycol, polypropylene glycol, poly(oxytetramethylene) glycol, polyester polyol, 4,4'-dihydroxyphenylsulfone, and the like. The diol having no dissociative group may be used alone, or two types or more thereof may be used in combination.

Specific Examples of Specific Polyester Resin

Hereinafter, specific examples of the specific polyester resin are exemplified as dicarboxylic acid and diol which are structural units of the polymer. Parentheses ( ) represent the molar ratio of the copolymerization component and brackets [ ] represent the content of the unit represented by Formula (F1).

P01: Terephthalic acid/isophthalic acid/bisphenol A ethylene oxide 2 mol adduct/ethylene glycol (50/50/50/50) [30%]

P02: Terephthalic acid/bisphenol A propylene oxide 2 mol adduct (100/100) [41%]

P03: Terephthalic acid/isophthalic acid/bisphenol A ethylene oxide 2 mol adduct (70/30/100) [43%]

P04: Terephthalic acid/5-sulfoisophthalic acid/bisphenol A 2 mol ethylene oxide adduct/ethylene glycol (95/5/50/50) [30%]

P05: Terephthalic acid/isophthalic acid/bisphenol A ethylene oxide 2 mol adduct/bisphenol A propylene oxide 2 mol adduct (50/50/50/50) [42%]

P06: Terephthalic acid/isophthalic acid/bisphenol A ethylene oxide 2 mol adduct/bisphenol A ethylene oxide 3 mol adduct/neopentyl glycol (50/50/20/40/40) [37%]

P07: Isophthalic acid/bisphenol A ethylene oxide 2 mol adduct/cyclohexanedimethanol (100/50/50) [27%]

P08: Terephthalic acid/bisphenol A propylene oxide 2 mol adduct/neopentyl glycol (100/80/20) [36%]

P09: Terephthalic acid/isophthalic acid/bisphenol A propylene oxide 2 mol adduct/neopentyl glycol (50/50/35/65) [22%]

P10: Terephthalic acid/isophthalic acid/bisphenol A ethylene oxide 2 mol adduct/bisphenol A propylene oxide 2 mol adduct/ethylene glycol (50/50/25/25/50) [30%]

Physical Properties of Specific Polyester Resin

The molecular weight range of the specific polyester resin is preferably 1,000 or more and 200,000 or less, more preferably 1,500 or more and 100,000 or less, and still more preferably 2,000 or more and 50,000 or less as a weight average molecular weight.

When the weight average molecular weight is 1,000 or more, the content proportion of the water-soluble component described later is reduced, and the compound is suitable for dispersing the compound represented by Formula (I) or Formula (II). On the other hand, when the weight average molecular weight is 200,000 or less, since the solubility in an organic solvent is excellent and the viscosity of a polymer solution dissolved in the organic solvent is suppressed, in preparing the particle dispersion liquid, it is easy to disperse in the aqueous medium, and thereby the dispersion stability of the particles is excellent.

The weight average molecular weight of the polymer is measured by Gel Permeation Chromatography (GPC) and calculated in terms of polystyrene.

The acid value of the specific polyester resin is preferably 5 mgKOH/g or more and 50 mgKOH/g or less. The lower limit is more preferably 8 mgKOH/g or more, and still more preferably 10 mgKOH/g or more. The upper limit is more preferably 40 mgKOH/g or less, and still more preferably 30 mgKOH/g or less.

When the acid value is 5 mgKOH/g or more, the dispersibility of the specific polyester resin in the aqueous medium is not too low, and the dispersion stability of the particles is excellent. On the other hand, when the acid value is 50 mgKOH/g or less, the water solubility of the specific polyester resin is not too high relatively, the formation property of particles containing the specific polyester resin and the compound represented by Formula (I) or Formula (II) is enhanced. Therefore, it is easy to obtain the particles stably dispersed in the aqueous medium.

The acid value of the resin can be determined by the neutralization titration method defined in JIS K0070 (1992).

The glass transition temperature of the specific polyester resin is preferably 40° C. or higher and 150° C. or lower. When the glass transition temperature is 40° C. or higher, it is excellent in scratch resistance and blocking resistance of an image formed using the ink containing the specific polyester resin. On the other hand, when the glass transition temperature is 150° C. or lower, the image formed using the ink containing the specific polyester resin is excellent in abrasion resistance.

From this viewpoint, the glass transition temperature of the specific polyester resin is more preferably 60° C. or higher and 140° C. or lower, and still more preferably 70° C. or higher and 130° C. or lower.

When the specific polyester resin is used as a polymer dispersion liquid, the proportion of the water-soluble component to the solid content contained in the dispersion liquid is preferably 10% by mass or less.

Normally, the individual molecules configuring the aggregate of the polymer have variations in the composition of the structural units, so that the solubility in water of each molecule varies. A polymer molecule having a relatively high solubility in water corresponds to the "water-soluble component" referred to herein. Since the water-soluble component, that is, the polymer molecule having relatively high solubility in water, has low compatibility with the dispersion of the compound represented by Formula (I) or Formula (II), when the specific polyester resin is used as the polymer dispersion liquid, the specific polyester resin is preferably as small as the amount of the water-soluble component contained in the dispersion liquid. In addition, swelling of the particles containing the specific polyester resin and adhesion between the particles can be suppressed, from the viewpoint of maintaining stable dispersion, when the specific polyester resin is used as the polymer dispersion liquid, the specific polyester resin is preferably as small as the amount of the water-soluble component contained in the dispersion liquid. From these viewpoints, when the specific polyester resin is used as the dispersion liquid, the proportion of the water-soluble component to the solid content amount contained in the dispersion liquid is preferably 10% by mass or less, more preferably 8% by mass or less, still more preferably 5% by mass or less, and is preferably as small as possible.

The proportion of the water-soluble component is measured by the following method.

A polymer dispersion liquid (solid content concentration: 10% by mass, liquid temperature: 23±0.5° C.) in which a polymer is dispersed in water is prepared. At that time, a neutralizing agent is used as necessary for dispersion of the polymer. The polymer dispersion liquid was centrifuged on a dispersoid and a medium using a centrifugal ultrafiltration filter unit, the separated medium was dried to measure the mass of the dry matter. The proportion of the amount of dry matter of the medium to the solid content of the resin dispersion liquid (=amount of polymer used for preparing polymer dispersion liquid+mass of neutralizing agent used in preparing process of polymer dispersion liquid) was calculated, and the proportion was defined as the proportion (% by mass) of the water-soluble component.

Other Resin

In the present embodiment, as the resin contained in the particles, a resin other than the specific polyester resin may be used in combination. Examples of the resins other than the specific polyester resin include polyester, polyurethane, polyamide, polyurea, polycarbonate, and the like.

However, it is preferable that the specific polyester resin among the total resin contained in the particles is the main resin, and it is preferable that the specific polyester resin among the total resin is the resin having the largest mass. Specifically, the mass ratio of the specific polyester resin in the total resin is preferably more than 50% by mass, more preferably 80% by mass or more, further preferably 90% by mass or more, and particularly preferably 100% by mass.

[Aqueous Medium]

As the medium of the particle dispersion liquid, the same aqueous medium as in the first embodiment can be used.

[Other Components]

The particle dispersion liquid according to the present embodiment may contain other components in the same manner as the first embodiment.

[Method for Preparing Particle Dispersion Liquid]

Examples of the method for preparing the particle dispersion liquid of the first embodiment or the second embodiment include a phase inversion emulsification method and an impregnation method in which the particles of the specific resin are impregnated with a compound having an infrared absorption capacity, and the phase inversion emulsification method is preferable.

The phase inversion emulsification method is a method in which a compound (including at least one compound (specific compound) of the compound represented by Formula (I) and the compound represented by Formula (II)) having an infrared absorption capacity in an organic solvent and a solution in which a specific resin is dissolved are prepared and a neutralizing agent is added to the solution to neutralize the specific resin, and thereafter, water is gradually mixed to form the particles containing both the compound having the infrared absorption capacity and the specific resin into particles to form a dispersed state. Here, the dispersion state may be emulsification in which liquid particles are dispersed, or may be a suspension in which solid particles are dispersed, and from the viewpoint of dispersion stability, the suspension in which the solid particles are dispersed is preferable. In a case where the solubility of the organic solvent in water is 10% by mass or less, or in a case where the vapor pressure of the organic solvent is larger than that of water, the organic solvent is preferably removed from the viewpoint of the dispersion stability of the particles. Neutralization is not an essential process, but in a case where the specific resin has an unneutralized dissociative group, the neutralization is preferably performed from the viewpoint of adjusting the pH of the dispersion liquid, and the like.

The impregnation method is a method in which a particle dispersion liquid of a specific resin is prepared, the particle dispersion liquid and a solution in which a compound (including at least one compound (specific compound) of the compound represented by Formula (I) and the compound represented by Formula (II)) having an infrared absorption capacity is dissolved in an organic solvent are mixed, and thereafter, the organic solvent is gradually removed to impregnate the compound having the infrared absorption capacity into the particles of the specific resin to form particles. The particles of the specific resin may be liquid particles or solid particles, and from the viewpoint of dispersion stability, the solid particles are preferable. The particle dispersion liquid of the specific resin is prepared, for example, by preparing a solution in which the specific resin is dissolved, neutralizing by adding a neutralizing agent to the solution, and thereafter, removing the organic solvent while gradually mixing water.

Organic Solvent

The organic solvent used for the phase inversion emulsification method and the impregnation method is selected based on the solubility of the compound (including at least one (specific compound) of the compounds represented by Formula (I) and Formula (II)) having infrared absorption capacity and the solubility of the specific resin or specific polyester resin. Specific examples thereof include ketone-based solvents such as acetone, methyl ethyl ketone, and diethyl ketone; alcohol-based solvents such as methanol, ethanol, 2-propanol, 1-propanol, 1-butanol, and tert-butanol; chlorine-based solvents such as chloroform and methylene chloride; aromatic-based solvents such as benzene and toluene; ester-based solvents such as ethyl acetate, butyl acetate, and isopropyl acetate; ether-based solvents such as diethyl ether, tetrahydrofuran, and dioxane; glycol ether-based solvents such as ethylene glycol monomethyl ether and ethylene glycol dimethyl ether; and the like. These organic solvents may be used alone, or two types or more thereof may be used in combination.

The amount of the organic solvent used is preferably 10 parts by mass or more and 2,000 parts by mass or less, and more preferably 100 parts by mass or more and 1,000 parts by mass or less with respect to 100 parts by mass of the specific resin or the specific polyester resin. When the amount of the organic solvent used is 10 parts by mass or more per 100 parts by mass with respect to the specific resin or the specific polyester resin, the dispersion of the particles is stabilized. When the amount of the organic solvent used is 2,000 parts by mass or less with respect to 100 parts by mass of the specific resin, the process of removing the organic solvent is unnecessary or can be completed in a short time.

Neutralizing Agent

Examples of the neutralizing agent used in the phase inversion emulsification method and the impregnation method include an organic base and an inorganic alkali in a case where the specific resin has an anionic group. Examples of organic bases include triethanolamine, diethanolamine, N-methyldiethanolamine, dimethylethanolamine, and the like. Examples of the inorganic alkali include alkali metal hydroxides (for example, sodium hydroxide, lithium hydroxide, potassium hydroxide, and the like), carbonates (for example, sodium carbonate, sodium hydrogencarbonate, and the like), ammonia, and the like.

From the viewpoint of the dispersion stability of the particles, the addition amount of the neutralizing agent is preferably such that the pH of the particle dispersion liquid is within the range described later.

The amount of the specific resin or the specific polyester resin used in the phase inversion emulsification method and the impregnation method, and the content of the specific resin or specific polyester resin contained in the particle dispersion liquid preferably range from 100 parts by mass to 9,900 parts by mass, and more preferably range from 300 parts by mass to 4,900 parts by mass with respect to 100 parts by mass of the compound (including at least one (specific compound) of the compounds represented by Formula (I) and Formula (II)) having the infrared absorption capacity. When the amount of the specific resin or the specific polyester resin used (content of the specific resin or the specified polyester resin) is 100 parts by mass or more with respect to 100 parts by mass of the compound having the infrared absorption capacity, the dispersion of the compound having the infrared absorption capacity is stabilized. When the amount of the specific resin or the specific polyester resin used (content of the specific resin or the specified polyester resin) is 9,900 parts by mass or less with respect to 100 parts by mass of the compound having the infrared absorption capacity, the infrared absorption efficiency of the infrared absorptive particle dispersion liquid is good.

In the phase inversion emulsification method and the impregnation method, the compound represented by Formula (I), the compound represented by Formula (II), and an organic compound other than the specific resin or the specific polyester resin may be used, and the compounds may be formed into particles together with the compound represented by Formula (I), the compound represented by Formula (II), and the specific resin or the specific polyester resin to form particles containing three components. Examples of the organic compound to be formed into particles together include a dye, a compound (for example, squarylium-based coloring matter, croconium-based coloring matter, naphthalocyanine-based coloring matter, cyanine-based coloring matter, aminium-based coloring matter, and the like) having an infrared absorption capacity other than the compound represented by Formula (I) and the compound represented by Formula (II), a compound (for example, benzotriazole-based compound, benzophenone-based compound, and the like) having an ultraviolet absorption capacity, and the like.

[Physical Properties of Particle Dispersion Liquid]

The volume average particle diameter of the particles contained in the particle dispersion liquid preferably ranges from 10 nm to 150 nm, more preferably ranges from 10 nm to 120 nm, and still more preferably ranges from 10 nm to 100 nm. When the volume average particle diameter is 10 nm or more, excellent light fastness is obtained. When the volume average particle diameter is 150 nm or less, excellent droplet ejection characteristics of inkjet method are obtained. The particle diameter distribution may be either a broad particle diameter distribution or a monodispersed particle diameter distribution.

The average particle diameter and particle diameter distribution of the particles can be measured, for example, by a light scattering method.

From the viewpoint of suppressing the decomposition of the compound represented by Formula (I) and Formula (II) and suppressing deterioration over time, the pH of the particle dispersion liquid according to the first embodiment or the second embodiment is preferably 10.5 or less, more preferably 10.0 or less, further preferably 9.5 or less, and still more preferably 9.0 or less. On the other hand, from the viewpoint of stably dispersing the specific resin or the specific polyester resin and the particles, the pH of the particle dispersion liquid is preferably 6.0 or more, more preferably 6.5 or more, and still more preferably 7.0 or more.

In addition, since the general aqueous ink is alkaline (approximately pH 8 to 10), from the viewpoint of preparing the aqueous ink using the particle dispersion liquid, the pH of the particle dispersion liquid is preferably in the above-described range.

The pH of the particle dispersion liquid is measured under the environment of a temperature of 23° C.±0.5° C. and a relative humidity of 55%±5%.

The surface tension of the particle dispersion liquid preferably ranges from 20 mN/m to 40 mN/m, and more preferably ranges from 25 mN/m to 35 mN/m. In the present embodiment, the surface tension of the particle dispersion liquid is measured using a Wilhelmy type surface tension meter under the environment of a temperature of 23° C.±0.5° C. and a relative humidity of 55%±5%.

The viscosity of the particle dispersion liquid preferably ranges from 1 mPa·s to 30 mPa·s, and more preferably ranges from 2 mPa·s to 20 mPa·s. The viscosity of the particle dispersion liquid is measured under the conditions of a temperature of 23° C.±0.5° C. and a shear rate of 1400 $s^{-1}$ using a TV-20 type viscometer (Toki Sangyo Co., Ltd.) as a measuring device.

<Aqueous Ink>

The aqueous ink according to the present embodiment is an aqueous ink containing an aqueous medium and particles dispersed in the aqueous medium, and the particle contains a compound represented by Formula (I) or Formula (II), and a specific resin or a specific polyester resin.

Details of the compound represented by Formula (I) or Formula (II), the specific resin or the specific polyester resin, and infrared absorptive particles in the aqueous ink according to the present embodiment are as described for the particle dispersion liquid according to the embodiment.

The aqueous ink according to the present embodiment is, for example, the particle dispersion liquid itself according to the present embodiment described above; a composition obtained by adding at least a coloring agent to the particle dispersion liquid according to the present embodiment; a composition obtained by adding commercially available aqueous ink to the particle dispersion liquid according to the embodiment; and the like.

[Aqueous Medium]

The medium of the aqueous ink is water or a mixed solvent containing water as a main solvent. The mixed solvent is, for example, a mixture of water and a water-soluble organic solvent. Examples of the water-soluble organic solvent include alcohol, polyhydric alcohol, a polyhydric alcohol derivative, nitrogen-containing solvent, sulfur-containing solvent, and the like. The details of water and the water-soluble organic solvent in the aqueous ink are the same as those described for the particle dispersion liquid.

The content of water is preferably 40% by mass or more and 80% by mass or less, and more preferably 50% by mass or more and 80% by mass or less with respect to the total mass of the aqueous ink.

The content of the water-soluble organic solvent is preferably 50% by mass or less, and more preferably 40% by mass or less with respect to the total mass of the aqueous ink.

[Coloring Agent]

Examples of the coloring agent include a pigment or a dye, and from the viewpoint of the light fastness of the image and the like, the pigment is preferable.

In a case where the pigment is used as the coloring agent, it is preferable to use a pigment dispersing agent in combination. Examples of the pigment dispersing agent include any known polymer dispersing agent, surfactant, and the like. The pigment dispersing agent may be used alone, or two types or more thereof may be used in combination. The content of the pigment dispersing agent varies depending on the type of the pigment and the type of the pigment dispersing agent, and thus cannot be said unconditionally, but the content is preferably 0.1% by mass or more and 100% by mass or less with respect to the pigment content.

As the pigment, a pigment which self-disperses in water (hereinafter referred to as "self-dispersion type pigment") can also be mentioned. The self-dispersion type pigment refers to a pigment having a hydrophilic group on the pigment surface and dispersed in water even when the pigment dispersing agent is absent. As the self-dispersion type pigment, for example, any known self-dispersion type pigment obtained by subjecting the pigment to surface modification treatment such as coupling agent treatment, polymer grafting treatment, plasma treatment, oxidation treatment, and reduction treatment can be mentioned.

As the pigment, a so-called microcapsule pigment coated with a resin can also be mentioned. Commercially available microcapsule pigments include pigments manufactured by DIC Corporation and Toyo Ink Mfg. Co., Ltd.

As the pigment, a resin-dispersed pigment obtained by physically adsorbing or chemically bonding a polymer compound to a pigment can also be mentioned.

Examples of the pigment include specific color pigments such as red, green, brown, and white; metallic lustrous pigments such as gold color and silver color; a colorless or light-colored extender pigment; a plastic pigment; particles obtained by fixing a dye or pigment to the surface of silica, alumina, polymer bead, or the like; insoluble lake product of dye; colored emulsion; colored latex; and the like.

In a case where the dye is used as the coloring agent, it is preferable that the dye is formed into particles together with the polymer dispersing agent (for example, the specific resin of the present disclosure), and the particles are contained in the aqueous ink.

In a case where the coloring agent is particulates, a volume average particle diameter thereof is, for example, 10 nm or more and 200 nm or less.

The content of the coloring agent is preferably 1% by mass or more and 25% by mass or less, and more preferably 2% by mass or more and 20% by mass or less with respect to the total mass of the aqueous ink.

[Additive]

The aqueous ink according to the present embodiment may contain various additives as necessary. Examples of the additives include polymer, a surfactant, a penetrant, a viscosity adjusting agent, a pH adjusting agent, a pH buffering agent, an antioxidant, an ultraviolet absorbing agent, a preservative, a fungicide, and the like. The aqueous ink according to the present embodiment may contain the compound having the infrared absorption capacity other than the compound represented by Formula (I) or Formula (II).

[Physical Properties of Aqueous Ink]

The volume average particle diameter of the particles contained in the aqueous ink preferably ranges from 10 nm to 150 nm, more preferably ranges from 10 nm to 120 nm, and still more preferably ranges from 10 nm to 100 nm. When the volume average particle diameter is 10 nm or more, excellent light fastness is obtained. When the volume average particle diameter is 150 nm or less, excellent droplet ejection characteristics of inkjet method are obtained. The particle diameter distribution may be either a broad particle diameter distribution or a monodispersed particle diameter distribution.

The average particle diameter and particle diameter distribution of the particles can be measured, for example, by a light scattering method.

The pH of the aqueous ink according to the embodiment is preferably ranges from 6.5 to 10.5, more preferably ranges from 7.0 to 10.0, and still more preferably ranges from 8.0 to 10.0. In the present embodiment, the pH of the aqueous ink is measured under the environment of a temperature of 23° C.±0.5° C. and a relative humidity of 55%±5%.

The surface tension of the aqueous ink according to the embodiment preferably ranges from 20 mN/m to 40 mN/m, and more preferably ranges from 25 mN/m to 35 mN/m. In the present embodiment, the surface tension of the aqueous ink is measured using a Wilhelmy type surface tension meter under the environment of a temperature of 23° C.±0.5° C. and a relative humidity of 55%±5%.

The viscosity of the aqueous ink according to the embodiment preferably ranges from 1 mPa·s to 30 mPa·s, and more preferably ranges from 2 mPa·s to 20 mPa·s. In the present embodiment, the viscosity of the aqueous ink is measured under the conditions of a temperature of 23° C.±0.5° C. and a shear rate of 1400 s$^{-1}$ using a TV-20 type viscometer (Toki Sangyo Co., Ltd.) as a measuring device.

<Ink Cartridge>

An ink cartridge according to the present embodiment is a cartridge containing the aqueous ink according to the present embodiment. The ink cartridge according to the present embodiment is provided, for example, in a detachable form to an inkjet recording apparatus.

<Recording Apparatus and Recording Method>

The recording apparatus according to the present embodiment is provided with ink applying means for containing the aqueous ink according to the present embodiment and applying the aqueous ink to a recording medium, and infrared irradiation means for irradiating infrared rays on the aqueous ink applied to the recording medium. A recording method including an ink applying process of applying the aqueous ink according to the present embodiment to the recording medium, and an infrared irradiation process of irradiating infrared rays on the aqueous ink applied to the recording medium is realized by the recording apparatus according to the embodiment.

Examples of the ink applying means in the embodiment include: ejecting means for ejecting ink by an inkjet method; coating means with a roll, a spray, a sponge or the like; and printing means by offset printing, screen printing, gravure printing, letterpress printing or the like.

The ink applying means in the embodiment is preferably ejecting means for ejecting ink by the inkjet method. The recording apparatus and the recording method to which the inkjet method are applied are excellent in ejection stability by using the aqueous ink according to the present embodiment.

The recording apparatus according to the present embodiment includes the infrared irradiation means as drying means for drying the aqueous ink applied to the recording medium. The recording apparatus according to the present embodiment may be provided with contact type heating means such as a heating roll, a heating drum, a heating belt or the like, warm air blowing means including a heating element and an air blower, a combination thereof in addition to the infrared irradiation means as the drying means.

Examples of the recording medium include paper; paper coated with a resin; and films and plates made of resin, metal, glass, ceramics, silicon, rubber or the like.

The recording apparatus according to the present embodiment may be provided with an ink cartridge containing the aqueous ink according to the present embodiment, and formed into a cartridge so as to be attached to and detached from the recording apparatus.

Hereinafter, an example of the recording apparatus and the recording method according to the present embodiment will be described with reference to a drawing.

FIG. 1 is a schematic configuration diagram showing an example of a recording apparatus according to the embodiment. The recording apparatus 12 shown in FIG. 1 is the inkjet recording apparatus.

The recording apparatus 12 shown in FIG. 1 is provided with a container 16 for storing the recording medium P before image recording, an endless transport belt 28 stretched around a driving roll 24 and a driven roll 26, ink ejection heads which is an example of the ink applying means (ink ejection heads 30Y, 30M, 30C, and 30K. When collectively referred to, they are referred to as an ink ejection head 30), an infrared irradiation device (infrared irradiation devices 60Y, 60M, 60C, and 60K. When collectively referred to, they are referred to as an infrared irradiation device 60), and a container 40 for storing the recording medium P after image recording, in a housing 14.

Between a container 16 and the transport belt 28 is a transport path 22 on which the recording medium P before image recording is transported, and a roll 18 for picking up the recording medium P one by one from the container 16 and a plurality of roll pairs 20 for transporting the recording medium P are disposed on the transport path 22. On the upstream side of the transport belt 28, a charging roll 32 is disposed. The charging roll 32 is driven while interposing the transport belt 28 and the recording medium P between the charging roll 32 and the driven roll 26 to generate a potential difference between the charging roll 32 and the driven roll 26 which is grounded, so as to apply an electric charge to the recording medium P, and to electrostatically attract the recording medium P to the transport belt 28.

The ink ejection head 30 is disposed above the transport belt 28 so as to face the flat portion of the transport belt 28. A region where the ink ejection head 30 and the transport belt 28 face each other is a region where ink droplets are ejected from the ink ejection head 30.

Each of the ink ejection heads 30Y, 30M, 30C, and 30K is a head for recording an image of Y (yellow) color, a head for recording an image of M (magenta) color, a head for recording an image of C (cyan) color, and a head for recording an image of K (black) color. The ink ejection heads 30Y, 30M, 30C, and 30K are arranged, for example, in this order from the upstream side to the downstream side of the transport belt 28. The ink ejection heads 30Y, 30M, 30C, and 30K are connected to ink cartridges 31Y, 31M, 31C, and 31K of respective colors to be attached to and detached from the recording apparatus 12 through supply pipes (not shown), and the ink of each color is supplied from the ink cartridges to the ink ejection heads.

Examples of the ink ejection head 30 include an elongated head having an effective recording region (arrangement region of nozzles for ejecting ink) which is equal to or longer than the width of the recording medium P (length in the direction orthogonal to the transporting direction of the recording medium P); and a carriage type head that is shorter than the width of the recording medium P and moves in the width direction of the recording medium P to eject ink.

Examples of the inkjet method adopted by the ink ejection head 30 include a piezo method that uses a vibration pressure of a piezoelectric element; a charge control method in which ink is ejected using electrostatic attraction; an acoustic inkjet method in which an electric signal is converted into an acoustic beam with which ink is irradiated, and the ink is ejected by using an irradiation pressure; a thermal inkjet method in which bubbles are formed by heating ink to use the generated pressure, and the like.

The ink ejection head 30 is, for example, a low resolution recording head (for example, 600 dpi recording head) which ejects ink droplets in a range of 10 pL or more and 15 pL or less of ink droplet amount, and a high resolution recording head (for example, 1,200 dpi recording head) which ejects ink droplets in a range of less than 10 pL of ink droplet amount. Here, dpi refers to "dots per inch".

The recording apparatus 12 is not limited to a configuration including four ink ejection heads. The recording apparatus 12 may be a configuration including four or more ink ejection heads with an intermediate color added to Y, M, C, and K; and a configuration including one ink ejection head and recording only one color image.

At the downstream side of the ink ejection head 30, infrared irradiation means devices 60Y, 60M, 60C, and 60K are disposed above the transport belt 28 for each color ink ejection head. The infrared irradiation device 60 (example of an infrared irradiation means) irradiates the ink on the recording medium P with infrared rays to dry the ink.

Examples of the light source of the infrared irradiation device 60 include a light emitting diode, semiconductor lasers, surface emitting semiconductor lasers, a halogen lamp, and a xenon lamp.

Examples of the infrared irradiation device 60 include an elongated infrared irradiation device in which an effective infrared irradiation region (arrangement region of a light source that irradiates with infrared rays) is set to be equal to or larger than the width of the recording region by the ink ejection head 30; and a carriage type infrared irradiation device which is shorter than the width of the recording region by the ink ejection head 30 and moves in the width direction of the recording medium P and irradiates with infrared rays.

The irradiation conditions of the infrared irradiation device 60 are set according to the infrared absorption performance of the ink, the moisture content in the ink, and the like. As the irradiation condition, an irradiation condition for drying the moisture content in the ink applied to the recording medium P to 10% by mass or less is preferable. Specifically, for example, a center wavelength is 700 nm or more and 1,200 nm or less (preferably 780 nm or more and 980 nm or less), an irradiation intensity is 0.1 J/cm$^2$ or more and 10 J/cm$^2$ or less (preferably 1 J/cm$^2$ or more and 3 J/cm$^2$ or less), and an irradiation time is 0.1 milliseconds or more and 10 seconds or less (preferably 10 milliseconds or more and 100 milliseconds or less).

The recording apparatus 12 is not limited to the configuration in which the infrared irradiation device is provided for each ink ejection head of each color but may be the configuration in which only one infrared irradiation device is provided on the downstream side of the most downstream ink ejection head.

The recording apparatus 12 may include at least one of a contact type heating means and a warm air blowing means as the ink drying means together with the infrared irradiation device 60. For example, the contact type heating means or the warm air blowing means performs drying under the condition of increasing the surface temperature of the recording medium to a range of 50° C. or higher and 120° C. or lower.

On the downstream side of the infrared irradiation device 60, a peeling plate 34 is disposed so as to face the driving roll 24. The peeling plate 34 peels the recording medium P from the transport belt 28.

Between the transport belt 28 and the container 40 is a transport path 36 on which the recording medium P after the image recording is transported, and a plurality of roll pairs 38 for transporting the recording medium P are disposed on the transport path 36.

The operation of the recording apparatus 12 will be described.

The recording medium P before the image recording is picked up one by one from the container 16 by the roll 18 and is transported to the transport belt 28 by the plurality of roll pairs 20.

Subsequently, the recording medium P is electrostatically attracted to the transport belt 28 by the charging roll 32 and transported downward of the ink ejection head 30 by the rotation of the transport belt 28.

Subsequently, ink is ejected from the ink ejection head 30 on the recording medium P, and an image is recorded.

Subsequently, the ink on the recording medium P are irradiated with the infrared rays from the infrared irradiation device 60, the ink generates heat due to infrared absorption, the ink temperature rises, and the ink dries.

Subsequently, the recording medium P on which the ink is dried and to which the image is fixed is peeled from the transport belt 28 by the peeling plate 34, and transported to the container 40 by the plurality of roll pairs 38.

The recording apparatus according to the present embodiment is not limited to the configuration in which ink is directly applied from the ink applying means to the recording medium, but may a configuration in which ink is applied from the ink applying means to the intermediate transfer body and thereafter the ink on the intermediate transfer body is transferred to the recording medium.

The recording apparatus according to the present embodiment is not limited to a sheet processing apparatus as an example of the recording apparatus 12 shown in FIG. 1, but may be a rotary press.

Examples

Hereinafter, the present invention will be described in detail with reference to Examples, but the present invention is not limited to these Examples. In the following description, "parts" and "%" are all based on mass unless otherwise specified.

<Synthesis of Compound Represented by Formula (I)>
[Synthesis of Compound (I-a-1)]

Compound (I-a-1) was synthesized according to the following reaction scheme.

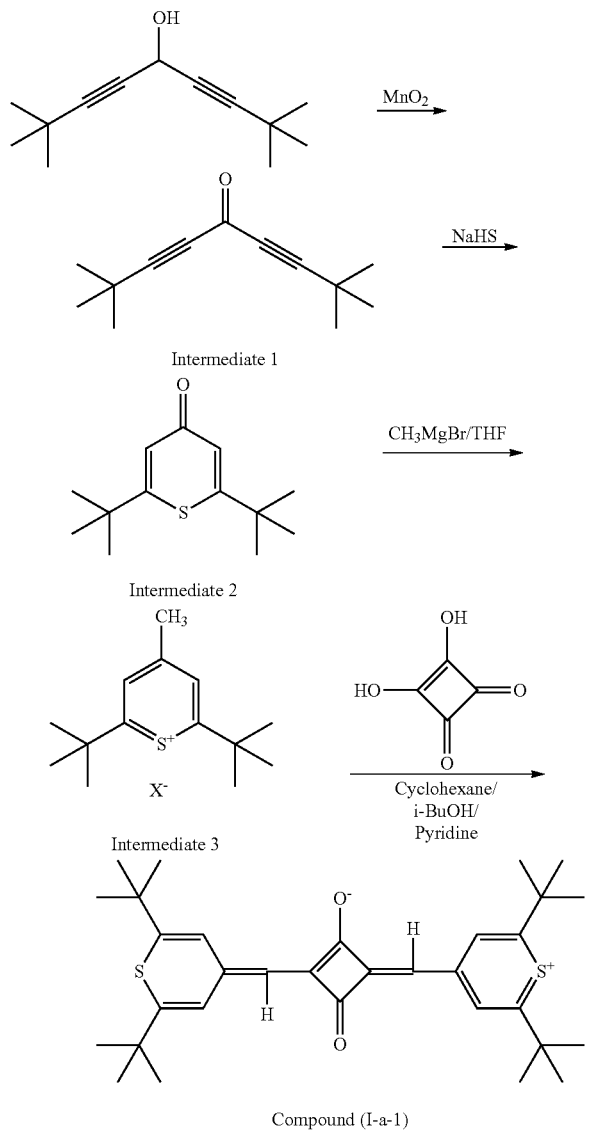

A Dean-Stark trap, a reflux condenser tube, a stirring seal, and a stirring bar were installed in a three-necked flask to prepare a reaction vessel. 2,2,8,8-tetramethyl-3,6-nonadiyne-5-ol and cyclohexane were placed in the reaction vessel. Manganese oxide (IV) powder was added, stirred with a three-one motor, and heated under reflux. The water formed during the reaction was removed by azeotropic distillation. It was confirmed by thin layer chromatography that 2,2,8, 8-tetramethyl-3,6-nonadiyne-5-ol did not remain. The reaction mixture was allowed to cool and filtered under reduced pressure to obtain a yellow filtrate (F1). The filtered solid was transferred to another container, ethyl acetate was added, ultrasonic dispersion and filtration were repeated four times to obtain an ethyl acetate extract solution (F2). The ethyl acetate extract solution (F2) and the filtrate (F1) were mixed and concentrated by a rotary evaporator and then a vacuum pump to obtain an orange liquid. The orange liquid was distilled under reduced pressure to obtain a pale yellow liquid (Intermediate 1).

A thermometer and a dropping funnel were placed in a three-necked flask to prepare a reaction vessel. Sodium hydrogen sulfide n-hydrate was added to ethanol, and the mixture was stirred at room temperature (20° C.) until dissolved, and then cooled with ice water. When the internal temperature reached 5° C., a mixed solution of intermediate 1 and ethanol was added dropwise little by little. The liquid changed from yellow to orange by dropwise addition. Since the internal temperature rises due to heat generation, the mixed solution was dropped in the range of the internal temperature of 5° C. to 7° C. while adjusting the amount of drops. Thereafter, the ice water bath was removed, and the mixed solution was stirred while spontaneously raising the temperature at room temperature (20° C.). Water was added to the reaction solution, and ethanol was removed by a rotary evaporator. Thereafter, salt was added until saturation, and the mixed solution was separated with ethyl acetate to recover the organic phase. The organic phase was washed twice with saturated ammonium chloride and dried over magnesium sulfate. After drying, the organic phase was concentrated under reduced pressure to recover a brown liquid. The brown liquid was distilled under reduced pressure. The distillate starts to be discharged from 200° C., but since the purity of the target component is low in the first distillate, when the amount of steam has increased, the main distillate was taken. The yellow liquid (Intermediate 2) was distilled.

A stirring bar and the intermediate 2 were placed in a three-necked flask, a nitrogen inlet tube and a reflux condenser were attached, and the atmosphere was substituted with nitrogen. Under a nitrogen atmosphere, anhydrous tetrahydrofuran was added via a syringe, and a 1M tetrahydrofuran solution of methylmagnesium bromide was added dropwise with a syringe while stirring at room temperature (20° C.). After completion of the dropwise addition, the reaction solution was heated, stirred, and refluxed. Under a nitrogen atmosphere, the reaction solution was allowed to cool, and then a solution of ammonium bromide dissolved in water was added dropwise while cooling in an ice water bath. The reaction mixture was further stirred at room temperature (20° C.), and thereafter n-hexane was added and dried over sodium sulfate. After drying, the n-hexane/tetrahydrofuran solution was taken out with a syringe and the inorganic layer was washed with ethyl acetate to obtain an extract solution. The n-hexane/tetrahydrofuran solution and an extract solution from the inorganic layer were mixed, concentrated under reduced pressure and then dried under vacuum to obtain Intermediate 3.

Under a nitrogen atmosphere, Intermediate 3 and squaric acid were dispersed in a mixed solvent of cyclohexane and isobutanol, pyridine was added, and the mixture was heated under reflux. Thereafter, isobutanol was added and the reaction mixture was further heated under reflux. Water generated during the reaction was removed by azeotropic distillation. The reaction mixture was allowed to cool and filtered under reduced pressure to remove insoluble matter. The filtrate was concentrated on a rotary evaporator. Methanol was added to the residue, heated to 40° C., and thereafter, the solution cooled to −10° C. Crystals were obtained by filtration, and the crystals were dried under vacuum to obtain a compound (I-a-1).

[Synthesis of Compound (I-a-4)]

Compound (I-a-4) was synthesized in the same manner as in the synthesis of the compound (I-a-1) except that 4,7-dodecadiyn-6-ol was used instead of 2,2,8,8-tetramethyl-3,6-nonadiyne-5-ol.

<Synthesis of Polymer>

[Synthesis of Polymer P41]

25.0 parts of methyl ethyl ketone were charged into a 0.5-liter three-necked flask provided with a stirrer, a thermometer, a reflux condenser tube, and a nitrogen gas inlet tube, and the temperature was raised to 80° C. While maintaining the internal temperature of the reaction vessel at 80° C., a mixed solution including monomers shown below, 70 parts of methyl ethyl ketone, and 1.6 parts of a polymerization initiator "V-601" (manufactured by Wako Pure Chemical Industries, Ltd.) was added dropwise for 2 hours. After completion of the dropwise addition, a solution including 0.4 parts of "V-601" and 10.0 parts of methyl ethyl ketone was added and stirred at 80° C. for 2 hours. Thereafter, a solution including 0.4 part of "V-601" and 10.0 parts of methyl ethyl ketone was further added and stirred at 80° C. for 2 hours. Thereafter, the temperature was raised to 85° C., and stirring were further continued for 2 hours to obtain a polymer P41 solution.

—Monomer—

Isobornyl methacrylate (IBOMA, manufactured by Wako Pure Chemical Industries, Ltd.) 30.0 parts Methyl methacrylate (MMA, manufactured by Wako Pure Chemical Industries, Ltd.) 42.0 parts Styrene (St, manufactured by Wako Pure Chemical Industries, Ltd.) 20.0 parts Methacrylic acid (MAA, manufactured by Wako Pure Chemical Industries, Ltd.) 8.0 parts The weight average molecular weight (Mw) of the obtained polymer P41 was 32,000 (calculated in terms of polystyrene by GPC), the acid value was 52 (mgKOH/g), and the solid content concentration was 48%.

[Synthesis of Polymers P41-1, P41-2, P41-3, P05, P11, P13, P17, H02, P06, P06-1, P06-2, and P06-3]

Solutions of polymers P41-1, P41-2, P41-3, P05, P11, P13, P17, P06, P06-1, P06-2, P06-3, and H02 were obtained in the same manner as the synthesis of the polymer P41, except that the type and amount of the monomer were changed in accordance with Tables 4 to 6.

[Synthesis of Polymer P44]

10.0 parts of ethanol were charged into a 0.5-liter three-necked flask provided with a stirrer, a thermometer, a reflux condenser tube, and a nitrogen gas inlet tube, and the temperature was raised to 80° C. While maintaining the internal temperature of the reaction vessel at 80° C., a mixed solution including monomers shown below, 60 parts of ethanol, 6 parts of water, and 1.0 parts of a polymerization initiator "V-601" (manufactured by Wako Pure Chemical Industries, Ltd.) was added dropwise for 2 hours. After completion of the dropwise addition, a solution including 0.2 parts of "V-601" and 10.0 parts of methyl ethyl ketone was added and stirred at 80° C. for 2 hours. Thereafter, a solution including 0.2 part of "V-601" and 10.0 parts of methyl ethyl ketone was further added and stirred at 80° C. for 2 hours. Thereafter, the temperature was raised to 85° C., and stirring were further continued for 2 hours to obtain a polymer P44 solution.

—Monomer—

2-acrylamide-2-methylpropanesulfonic acid (manufactured by Wako Pure Chemical Industries, Ltd.) 4.0 parts Dicyclopentanyl methacrylate (manufactured by Hitachi Chemical Co., Ltd.) 30.0 parts Styrene (manufactured by Wako Pure Chemical Industries, Ltd.) 20.0 parts Methyl methacrylate (manufactured by Wako Pure Chemical Industries, Ltd.) 46.0 parts The weight average molecular weight (Mw) of the obtained polymer P44 was 26,000 (calculated in terms of polystyrene by GPC), the acid value was 11 (mgKOH/g), and the solid content concentration was 48%. In addition, the average content (bridged alicyclic group content) (% by mass) in the polymer molecular structure of the bridged alicyclic group is shown in the following Table 1.

[Synthesis of Polymers P44-1, P44-2, P47, and H01]

Solutions of polymers P44-1, 44-2, P47, and H01 were obtained in the same manner as in the synthesis of polymer P44 except that the type and amount of monomers were changed in accordance with Tables 4 and 5.

<Preparation of Dispersion Liquid>

[Preparation of Particle Dispersion Liquid (AD-1)]

2.0 ml of methyl ethyl ketone (MEK) was added to 2.1 g of the above-mentioned polymer P41 solution and the mixture was stirred, and a 10% aqueous solution of sodium hydroxide was added while stirring so as to neutralize 0.8 equivalent of the total amount of the carboxylic acid contained in the polymer P41. To this solution, 40 mg of the compound (I-a-1) and 1.0 ml of tetrahydrofuran (THF) were added and dissolved. 12 ml of water was gradually added while stirring was continued.

Next, a distillation tube and a depressurization pump were attached to the flask, the solution was heated to 30° C. or higher and 35° C. or lower, the pressure was reduced while stirring, and part of the organic solvent and water was distilled off. In the middle, an operation to concentrate by adding water so that the solid content concentration does not exceed 13% was repeated until the organic solvent odor disappeared. The concentrate was filtered through a 0.45 μm filter to obtain a dispersion liquid.

With regard to this dispersion liquid, "yield" (solid content) was determined by a method described later. On the basis of the measured solid content, water was added to this dispersion liquid to adjust the solid content concentration to 10% by mass to obtain a particle dispersion liquid (AD-1).

When converted from the amount of the compound (I-a-1) used in the preparation of the particle dispersion liquid (AD-1) and the amount of the polymer, the concentration of the compound (I-a-1) in the particle dispersion liquid (AD-1) was 0.4% by mass.

[Preparation of Particle Dispersion Liquids (AD-2 to AD-4, AD-8 to AD-11, and AD-16)]

Particle dispersion liquids (AD-2 to AD-4, AD-8 to AD-11, and AD-16) were obtained in the same manner as in the preparation of the particle dispersion liquid (AD-1), except that the polymer was changed as shown in Tables 1 and 2.

[Preparation of Particle Dispersion Liquid (AD-5)]

To 2.1 g of the polymer P44 solution, 2.0 ml of methyl ethyl ketone (MEK) was added and stirred. To this solution, 40 mg of the compound (I-a-1) and 1.0 ml of tetrahydrofuran (THF) were added and dissolved. 12 ml of water was gradually added while stirring was continued.

Next, a distillation tube and a depressurization pump were attached to the flask, the solution was heated to 30° C. or higher and 35° C. or lower, the pressure was reduced while stirring, and part of the organic solvent and water was distilled off. In the middle, operation to concentrate by adding water so that the solid content concentration does not exceed 13% was repeated until the organic solvent odor disappeared. The dispersion liquid was filtered through a 0.45 µm filter, to obtain a particle dispersion liquid (AD-5) having a solid content concentration of 10% and containing 0.4% by mass of the compound (I-a-1).

[Preparation of Particle Dispersion Liquids (AD-6 to AD-7, and AD-12)]

Particle dispersion liquids (AD-6 to AD-7 and AD-12) were obtained in the same manner as in the preparation of the particle dispersion liquid (AD-5), except that the polymers were changed as shown in Tables 1 and 2.

[Preparation of Particle Dispersion Liquids (AD-13 to AD-15)]

Particle dispersion liquids (AD-13 to AD-15) were obtained in the same manner as in the preparation of the particle dispersion liquid (AD-1), except that the type of the compounds and the type of the polymers were changed as shown in Tables 4 and 5.

The compound II used for the particle dispersion liquid (AD-15) is the following compound (absorption wavelength 847 nm and gram absorption 212).

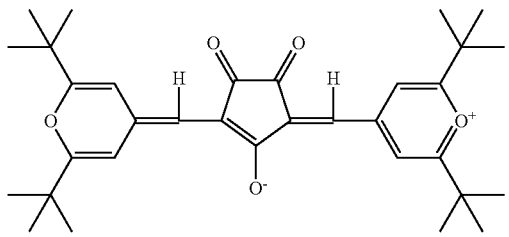

Compound II

[Preparation of Particle Dispersion Liquid (AD-17)]

A particle dispersion liquid (AD-17) was obtained in the same manner as in the preparation of the particle dispersion liquid (AD-15), except that the type of the polymer was changed as shown in Table 2.

[Preparation of Particle Dispersion Liquid (AD-18)]

A particle dispersion liquid (AD-18) was obtained in the same manner as in the preparation of the particle dispersion liquid (AD-17), except that the type of the compound was changed as shown in Table 2. The compound III used for the particle dispersion liquid (AD-18) is the following compound (absorption wavelength 795 nm and gram absorption 245).

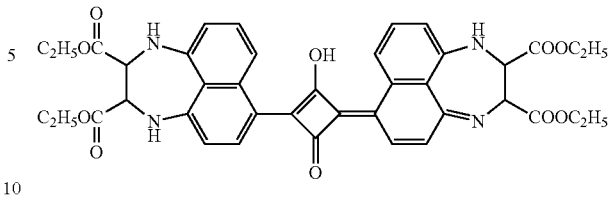

Compound III

[Preparation of Particle Dispersion Liquid (AD-19 to AD-23)]

Particle dispersion liquids (AD-19 to AD-23) were obtained in the same manner as in the preparation of the particle dispersion liquid (AD-1), except that the polymers were changed as shown in Tables 2 and 3.

[Evaluation]

(Yield)

Each particle dispersion liquid obtained from the above was weighed in an aluminum cup having a diameter of 5 cm in the range of 0.6 g or more and 0.8 g or less, and heated at 120° C. under atmospheric pressure for 2 hours. Thereafter, The mass of the solid content was measured, and the solid content in the dispersion liquid was determined. The mass obtained by neutralizing the polymer used in the preparation of the dispersion liquid with sodium hydroxide was calculated, and the yield was determined by the following formula. From this yield, evaluation was performed according to the following evaluation criteria.

Yield=(solid content in dispersion liquid)/(mass of polymer neutralized with sodium hydroxide)

—Evaluation Criteria—

A: 90% by mass or more
B: 80% by mass or more and less than 90% by mass
C: 70% by mass or more and less than 80% by mass
D: less than 70% by mass (Particle Diameter)

The volume average particle diameter (median diameter) of the particles was measured using a dynamic light scattering type particle diameter distribution measuring device LP-500 (Horiba, Ltd.).

(Infrared Absorption Amount)

Each particle dispersion liquid obtained as described above was stored at 50° C. for 1 day, diluted 1600 times and placed in a quartz cell having an optical path length of 1 cm, and the absorption spectrum was measured to determine the value of absorbance at a wavelength of 818 nm.

—Evaluation Criteria—

A: absorbance 0.7 or more
B: absorbance 0.5 or more and less than 0.7
C: absorbance 0.3 or more and less than 0.5
D: absorbance less than 0.3

TABLE 4

| | | | Sample | | | | | | | | |
|---|---|---|---|---|---|---|---|---|---|---|---|
| | | | AD-1 | AD-2 | AD-3 | AD-4 | AD-5 | AD-6 | AD-7 | AD-8 | AD-9 |
| Polymer | | | P41 | P41-1 | P41-2 | P41-3 | P44 | P44-1 | P44-2 | P05 | P11 |
| Monomer (Parts by Mass) | Containing Bridged Alicyclic Group | IBOMA | 30 | 30 | 28 | 25 | | | | 30 | |
| | | DCPMA | | | | | 30 | 30 | 30 | | 30 |
| | | DCPA | | | | | | | | | |
| | Others | PhOEMA | | | | | | | | 20 | |
| | | St | 20 | 20 | 18 | 16 | 20 | 20 | 20 | 30 | 20 |
| | | MMA | 42 | 40 | 41 | 43 | 46 | 47.6 | 48 | 15 | 44 |
| | | EMA | | | | | | | | | |
| | | cHMA | | | | | | | | | |

TABLE 4-continued

|  |  | Sample | | | | | | | | |
|---|---|---|---|---|---|---|---|---|---|---|
|  |  | AD-1 | AD-2 | AD-3 | AD-4 | AD-5 | AD-6 | AD-7 | AD-8 | AD-9 |
| Imparting Acid Value | CEA |  |  |  |  |  |  |  | 5 | 6 |
|  | MAA | 8 | 10 | 13 | 16 |  |  |  |  |  |
|  | AMPS |  |  |  |  | 4 | 2.4 | 2 |  |  |
|  | NaSS |  |  |  |  |  |  |  |  |  |
| Compound |  | I-a-1 | I-a-1 | I-a-1 | I-a-1 | I-a-1 | I-a-1 | I-a-1 | I-a-1 | I-a-1 |
| Acid Value AV |  | 52 | 65 | 85 | 104 | 11 | 7 | 5 | 19 | 23 |
| Bridged Alicyclic Group Content |  | 18 | 18 | 17 | 15 | 15 | 15 | 15 | 18 | 15 |
| Yield |  | A | A | B | D | A | C | D | A | A |
| Particle Diameter (nm) |  | 26 | 22 | 32 | 26 | 30 | 28 | 42 | 35 | 32 |
| Infrared Absorption Amount |  | A | A | A | A | A | B | B | A | A |
| Remarks |  |  | EXAMPLE |  | COMPAR-ATIVE EXAM-PLE | EXAMPLE |  | COMPAR-ATIVE EXAM-PLE | EXAMPLE |  |

TABLE 5

|  |  |  | Sample | | | | | | | | | |
|---|---|---|---|---|---|---|---|---|---|---|---|---|
|  |  |  | AD-10 | AD-11 | AD-12 | AD-13 | AD-14 | AD-15 | AD-16 | AD-17 | AD-18 | AD-19 |
| Polymer |  |  | P13 | P17 | P47 | P05 | P05 | P05 | H01 | P11 | P11 | H02 |
| Monomer (Parts by Mass) | Containing Bridged Alicyclic Group | IBOMA |  |  |  | 30 | 30 | 30 |  |  |  |  |
|  |  | DCPMA | 45 |  |  |  |  |  |  | 30 | 30 |  |
|  |  | DCPA |  | 40 | 50 |  |  |  |  |  |  |  |
|  | Others | PhOEMA |  |  |  | 20 | 20 | 20 |  |  |  |  |
|  |  | St |  | 15 |  | 30 | 30 | 30 |  | 20 | 20 |  |
|  |  | MMA | 48 | 39 |  | 15 | 15 | 15 |  | 44 | 44 | 54 |
|  |  | EMA |  |  | 47 |  |  |  | 47 |  |  | 40 |
|  |  | cHMA |  |  |  |  |  |  | 50 |  |  |  |
|  | Imparting Acid Value | CEA | 4 | 6 |  | 5 | 5 | 5 |  | 6 | 6 | 6 |
|  |  | MAA | 3 |  |  |  |  |  |  |  |  |  |
|  |  | AMPS |  |  |  |  |  |  |  |  |  |  |
|  |  | NaSS |  |  | 3 |  |  |  | 3 |  |  |  |
| Compound |  |  | I-a-1 | I-a-1 | I-a-1 | I-a-4 | I-b-2 | II | I-a-1 | II | III | I-a-1 |
| Acid Value AV |  |  | 35 | 23 | 8 | 19 | 19 | 19 | 8 | 23 | 23 | 23 |
| Bridged Alicyclic Group Content |  |  | 28 | 21 | 27 | 18 | 18 | 18 | 0 | 15 | 15 | 0 |
| Yield |  |  | A | A | A | A | A | C | B | C | D | B |
| Particle Diameter (nm) |  |  | 30 | 28 | 22 | 27 | 32 | 60 | 22 | 35 | 36 | 20 |
| Infrared Absorption Amount |  |  | A | A | A | A | B | D | B | D | D | B |
| Remarks |  |  |  |  | EXAMPLE |  |  |  | COMPARATIVE EXAMPLE |  |  |  |

TABLE 6

|  |  |  | Sample | | | |
|---|---|---|---|---|---|---|
|  |  |  | AD-20 | AD-21 | AD-22 | AD-23 |
| Polymer |  |  | P06 | P06-1 | P06-2 | P06-3 |
| Monomer (Parts by Mass) | Containing Bridged Alicyclic Group | IBOMA | 80 | 10 | 16 | 90 |
|  |  | DCPMA |  |  |  |  |
|  |  | DCPA |  |  |  |  |
|  | Others | PhOEMA |  |  |  |  |
|  |  | St |  |  |  |  |
|  |  | MMA |  |  |  |  |
|  |  | EMA | 14 | 84 | 78 | 4 |
|  |  | cHMA |  |  |  |  |
|  | Imparting Acid Value | CEA | 6 | 6 | 6 | 6 |
|  |  | MAA |  |  |  |  |
|  |  | AMPS |  |  |  |  |
|  |  | NaSS |  |  |  |  |
| Compound |  |  | I-a-1 | I-a-1 | I-a-1 | I-a-1 |
| Acid Value AV |  |  | 23 | 23 | 23 | 23 |
| Bridged Alicyclic Group Content |  |  | 49 | 6 | 10 | 56 |
| Yield |  |  | B | A | A | C |
| Particle Diameter (nm) |  |  | 42 | 32 | 38 | 120 |
| Infrared Absorption Amount |  |  | A | B | A | A |
| Remarks |  |  |  | EXAMPLE |  |  |

"Bridged alicyclic group content" described in Tables 4 to 6 represents the average content (% by mass) of the bridged alicyclic group in the polymer molecular structure.

Details of various monomers shown in Tables 4 to 6 are as follows.

Monomer having a bridged alicyclic group
IBOMA: isobornyl methacrylate
DCPMA: dicyclopentanyl methacrylate
DCPA: dicyclopentenyl acrylate or other monomer
PhOEMA: phenoxyethyl methacrylate
St: Styrene
BzA: Benzyl acrylate
MMA: methyl methacrylate
EMA: ethyl methacrylate
cHMA: cyclohexyl methacrylate or monomer giving acid value
CEA: Sipomer β-CEA (acrylic acid-2-carboxyethyl)
MAA: methacrylic acid
AMPS: 2-acrylamide-2-methylpropanesulfonic acid
NaSS: sodium styrenesulfonate As shown in Tables 4 to 6, in the samples (AD-4) and (AD-7) in which the acid value of the polymer is smaller than 6 mgKOH/g or larger than 100 mgKOH/g, a stable dispersion could not be obtained and the yield was low.

In addition, in the sample (AD-15) using the compound II not corresponding to any of the compound represented by Formula (I) and the compound represented by Formula (II), the particle diameter of the produced particles was large, and in the samples (AD-15), (AD-17), and (AD-18) using the compound II or the compound III not corresponding to any of the compound represented by Formula (I) and the compound represented by Formula (II), the amount of infrared absorption was small.

<Preparation of Aqueous Ink Composition>
(Preparation of Cyan Dispersion Liquid)

A mixed solution a of 6 parts of styrene, 11 parts of stearyl methacrylate, 4 parts of styrene macromer AS-6 (manufactured by Toagosei Co., Ltd.), 5 parts of Plomer PP-500 (manufactured by NOF Corporation), 5 parts of methacrylic acid, 0.05 parts of 2-mercaptoethanol, and 24 parts of methyl ethyl ketone was prepared in the reaction vessel.

On the other hand, a mixed solution b including 14 parts of styrene, 24 parts of stearyl methacrylate, 9 parts of styrene macromer AS-6 (manufactured by Toagosei Co., Ltd.), 9 parts of Plomer PP-500 (manufactured by NOF CORPORATION), 10 parts of methacrylic acid, 0.13 parts of 2-mercaptoethanol, 56 parts of methyl ethyl ketone, and 1.2 parts of 2,2'-azobis (2,4-dimethylvaleronitrile) was prepared and placed in a dropping funnel.

Subsequently, under a nitrogen atmosphere, the mixed solution a in the reaction vessel was heated to 75° C. while stirring, and the mixed solution b in the dropping funnel was gradually added dropwise over 1 hour. After 2 hours from the completion of the dropwise addition, a solution prepared by dissolving 1.2 parts of 2,2'-azobis (2,4-dimethylvaleronitrile) in 12 parts of methyl ethyl ketone was added dropwise over 3 hours. The solution was further aged at 75° C. for 2 hours and at 80° C. for 2 hours to obtain a methyl ethyl ketone solution of a water-insoluble polymer dispersant.

A part of the obtained water-insoluble polymer dispersant solution was isolated by removing the solvent. The obtained solid content was diluted to 0.1% with tetrahydrofuran, and the weight average molecular weight was measured by GPC. As a result, the isolated solid content had a weight average molecular weight in terms of polystyrene of 25,000.

In addition, 5.0 parts of the obtained water-insoluble polymer dispersant solution in terms of solid content, 10.0 parts of cyan pigment of Pigment Blue 15:3 (manufactured by Dainichi Seika), 40.0 parts of methyl ethyl ketone, 8.0 parts of 1 mol/L sodium hydroxide, 82.0 parts of ion-exchanged water, and 300 parts of 0.1 mm zirconia beads were supplied to the vessel, and dispersed for 6 hours at 1,000 rpm with a ready mill disperser (manufactured by Aimex). The obtained dispersion liquid was concentrated under reduced pressure until the methyl ethyl ketone was sufficiently distilled off with an evaporator and concentrated until the pigment concentration reached 10% to obtain a cyan dispersion liquid CD1 as water-insoluble coloring particles including a pigment having a front surface coated with a water-insoluble polymer dispersant.

The average particle diameter of the cyan pigment in the obtained cyan dispersion liquid CD1 was 77 nm.

(Preparation of Cyan Ink C-1)
An ink was prepared so as to have the following ink composition. After preparation, coarse particles were removed with a 5 μm filter to prepare a cyan ink C-1 as an aqueous ink composition.

| | |
|---|---|
| Cyan dispersion liquid CD 1 | 6% |
| Particle dispersion liquid (AD-1) (in terms of solid content) | 2.5% |
| Propylene glycol (manufactured by Wako Pure Chemical Industries, Ltd.) | 25% |
| Propylene glycol monobutyl ether | 3% |
| Olfine E1010 (Nisshin Chemical Industry) | 0.7% |
| Olfine E1004 (Nissin Chemical Industry) | 0.3% |
| Ion-exchanged water | added so that the total becomes 100% |

(Preparation of Cyan Inks C-2 to C-21)
Cyan Inks C-2 to C-21 were obtained in the same manner as in the preparation of the cyan ink C-1 except that the particle dispersion liquid (AD-1) was changed in the preparation of the cyan ink C-1 as shown in Tables 7 and 8 below.

[Print Evaluation Test]
When the cyan inks C-1 to C-21 immediately after preparation were refilled into cartridges of an inkjet printer PX-1004 manufactured by Epson Co., Ltd., and printing was performed on Tokubishi Art Double-sided N (Mitsubishi Paper Mills) with an inkjet printer PX-1004, excellent printing was possible without ejection failure in all the cyan inks C-1 to C-21.

Subsequently, the formed image was irradiated with infrared rays under the conditions of a central wavelength of 810 nm, an irradiation intensity of 3 J/cm$^2$, and an irradiation time of 200 ms, and visually observed whether the image was dried without bleeding.

—Evaluation Criteria—
A: No bleeding by visual observation
B: Bleeding by visual observation

[Concentration Redispersibility]
The obtained cyan inks C-1 to C-21 were placed in a glass petri dish, heated at 40° C., and concentrated to 40% (that is, 60% of the water was evaporated). Thereafter, ion-exchanged water was added again to dilute. The condition of the diluted solution was visually observed and evaluated based on the following evaluation criteria.

—Evaluation Criteria—
A: There are almost no solid matter on the petri dish, and almost no agglomerates in the diluted solution
B: There are almost no solid matter on the petri dish, and there are a few aggregates in the diluted solution
C: There is a small amount of solid matter on the petri dish, and aggregates are present in the diluted solution
D: The solid matter remains on more than half of the petri dish

TABLE 7

| | Cyan Ink | | | | | | | | | | | |
|---|---|---|---|---|---|---|---|---|---|---|---|---|
| | C-1 | C-2 | C-3 | C-4 | C-5 | C-6 | C-7 | C-8 | C-9 | C-10 | C-11 | C-12 |
| Polymer | P41 | P41-1 | P41-2 | P44 | P44-1 | P05 | P11 | P13 | P17 | P47 | P05 | P05 |
| Particle Dispersion Liquid | AD-1 | AD-2 | AD-3 | AD-5 | AD-6 | AD-8 | AD-9 | AD-10 | AD-11 | AD-12 | AD-13 | AD-14 |
| Print Evaluation | A | A | A | A | A | A | A | A | A | A | A | A |
| Concentration Redispersibility | A | A | A | A | A | A | A | A | A | A | A | A |
| Remarks | EXAMPLE | | | | | | | | | | | |

TABLE 8

| | Cyan Ink | | | | | | | | |
|---|---|---|---|---|---|---|---|---|---|
| | C-13 | C-14 | C-15 | C-16 | C-17 | C-18 | C-19 | C-20 | C-21 |
| Polymer | P05 | H01 | P11 | P11 | H02 | P06 | P06-1 | P06-2 | P06-3 |
| Particle Dispersion Liquid | AD-15 | AD-16 | AD-17 | AD-18 | AD-19 | AD-20 | AD-21 | AD-22 | AD-23 |
| Print Evaluation | B | A | B | B | B | A | A | A | A |
| Concentration Redispersibility | A | D | B | B | D | A | C | B | C |
| Remarks | COMPARATIVE EXAMPLE | | | | | EXAMPLE | | | |

As shown in Tables 7 and Table 8, in the cyan inks C-13, C-15, and C-16 using the particle dispersion liquid (AD-15), (AD-17), and (AD-18) using the compound II or the compound III not corresponding to any of the compound represented by Formula (I) and the compound represented by Formula (II), bleeding was visually observed in the formed image.

In addition, the cyan inks C-14 and C-17 using the polymer H01 or H02 not containing a structural unit having a bridged alicyclic group as a polymer were inferior in the concentration redispersibility.

<Synthesis of Polyester Resin>
[Synthesis of Polyester Resin P05]
Dimethyl terephthalate 97.1 parts
Dimethyl isophthalate 97.1 parts
Bisphenol A ethylene oxide 2 mol adduct 158.2 parts
Bisphenol A propylene oxide 2 mol adduct 172.2 parts Into a three-necked flask equipped with a stirrer and a distillation tube, the above raw material monomers, 0.1 part of calcium acetate and 0.1 part of antimony oxide (III) as a condensation catalyst were placed. The temperature was raised while distilling methanol and ethylene glycol prepared under nitrogen stream. The mixture was stirred for 30 minutes while being kept at 150° C., and further stirred for 1 hour being kept at 190° C. Subsequently, the temperature was lowered to 150° C., the interior of the reaction system was gradually depressurized with a pump under stirring. While maintaining the pressure in the interior of the reaction system in the range of 10 Pa or more and 40 Pa or less, the interior of the reaction system was heated while distilling out ethylene glycol, and the reaction was further performed at 250° C. for 3 hours. The product was taken out as it was and cooled to obtain 462 parts of polyester resin P05.

The polyester resin P05 had a weight average molecular weight (Mw) of 18,000 and an acid value of 13 mgKOH/g.

[Synthesis of Polyester Resin P03]
Polyester resin P03 was obtained in the same manner as the synthesis of polyester resin P05, except that the raw material monomer was changed to the following.
Dimethyl terephthalate 135.9 parts
Dimethyl isophthalate 58.2 parts
Bisphenol A ethylene oxide 2 mol adduct 316.4 parts

[Synthesis of Polyester Resin P04]
Polyester resin P04 was obtained in the same manner as the synthesis of polyester resin P05, except that the raw material monomer was changed to the following.
Dimethyl terephthalate 184.5 parts
Sodium 5-sulfoisophthalate 13 parts
Bisphenol A ethylene oxide 2 mol adduct 158.2 parts
Ethylene glycol 33 parts

[Synthesis of Polyester Resin P08]
Polyester resin P08 was obtained in the same manner as the synthesis of polyester resin P05, except that the raw material monomer was changed to the following.
Dimethyl terephthalate 194.2 parts
Bisphenol A propylene oxide 2 mol adduct 275.5 parts
Neopentyl glycol 20.8 parts

[Synthesis of Polyester Resin P09]
Polyester resin P09 was obtained in the same manner as the synthesis of polyester resin P05, except that the raw material monomer was changed to the following.
Dimethyl terephthalate 97.1 parts
Dimethyl isophthalate 97.1 parts
Bisphenol A propylene oxide 2 mol adduct 120.5 parts
Neopentyl glycol 68 parts

[Synthesis of Polyester Resin PH01]
Polyester resin PH01 was obtained in the same manner as the synthesis of polyester resin P05, except that the raw material monomer was changed to the following.
Dimethyl terephthalate 97.1 parts
Dimethyl isophthalate 97.1 parts
Bisphenol A ethylene oxide 2 mol adduct 79 parts
Neopentyl glycol 79 parts

[Synthesis of Polyester Resin PS01]
Polyester resin PS01 was obtained in the same manner as the synthesis of polyester resin P05, except that the raw material monomer was changed to the following.
Dodecenylsuccinic anhydride 106 parts
Bisphenol A propylene oxide 2 mol adduct 275.5 parts
Neopentyl glycol 20.8 parts
Fumaric acid 67 parts <Preparation of Particle Dispersion Liquid>
[Preparation of Particle Dispersion Liquid AD-1]

0.3 part of the squarylium compound serving as the compound (I-a-1) was placed in a flask. 14 parts of tetrahydrofuran were added to the flask, and a stirring bar was placed and stirred. Subsequently, 10 parts of polyester resin P05 was added, and 25 parts of methyl ethyl ketone were further added, stirred and mixed. Subsequently, a 10% by mass aqueous solution of sodium hydroxide which is 0.9 equivalents (neutralization degree 90%) of the total carboxy groups contained in the polyester resin P05 was added while stirring. Subsequently, 130 parts of water were gradually added while stirring, and water was mixed. After the mixture became nearly homogeneous, a distillation tube and a depressurization pump were attached to the flask. The mixed solution was heated so as to be 40° C. or higher and 50° C. or lower, the pressure was reduced while stirring, and a part of the organic solvent and water was distilled off. The operation of concentrating while replacing the organic solvent with water was repeated until the organic solvent odor disappeared while adjusting the addition amount of water so that the solid content concentration converted from the material did not exceed 12% by mass. The concentrate was filtered through a 230-mesh nylon mesh to obtain a particle dispersion liquid.

With regard to this particle dispersion liquid, the solid content was measured by the method described in the following (measurement of yield), and the yield was determined. On the basis of the measured solid content, water was added to this particle dispersion liquid to prepare the solid content concentration to 10% by mass to obtain a particle dispersion liquid AD-1. When converted from the amount of the compound (I-a-1) used in the preparation of the particle dispersion liquid and the amount of the polyester resin, the concentration of the compound (I-a-1) in the particle dispersion liquid AD-1 was 0.29% by mass.

(Measurement of Yield)

A part of the particle dispersion liquid was dried by heating at 120° C. under atmospheric pressure for 2 hours, the solid content (mass) was measured, and the yield was determined according to the following formula.

Solid content of the particle dispersion liquid÷
(amount of the compound used for preparing
the particle dispersion liquid+solid content of
the polymer solution used for preparing the particle dispersion liquid+mass of the sodium
hydroxide used for neutralization in the process
of preparing the particle dispersion liquid)×100    [Formula]:

[Preparation of Particle Dispersion Liquids AD-2 to AD-7 and AD-9 to AD-10]

Each particle dispersion liquid was obtained in the same manner as in the preparation of the particle dispersion liquid AD-1, except that the type and the neutralization degree (equivalent ratio (%) of the addition amount of sodium hydroxide to the total acid groups contained in the polyester resin) of the polyester resin and the compound were changed according to Table 9.

[Preparation of Particle Dispersion Liquid AD-8]

A particle Dispersion Liquid AD-8 was obtained in the same manner as in the preparation of the particle dispersion liquid AD-1, except that 0.65 part of the compound (I-b-2) instead of 0.3 part of the compound (I-a-1) was used in the preparation of the particle dispersion liquid AD-1.

In Table 9, "I-a-4" is the compound (I-a-4), "I-b-2" is the compound (I-b-2), "II" is the compound (II) represented by the following structural formula.

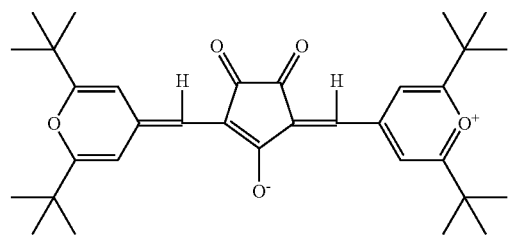

Compound II

<Preparation of Aqueous Ink>
(Preparation of Cyan Dispersion Liquid)

A mixed solution of 6 parts of styrene, 11 parts of stearyl methacrylate, 4 parts of styrene macromer AS-6 (manufactured by Toagosei Co., Ltd.), 5 parts of Plomer PP-500 (manufactured by NOF CORPORATION), 5 parts of methacrylic acid, 0.05 parts of 2-mercaptoethanol, and 24 parts of methyl ethyl ketone was prepared in the reaction vessel.

On the other hand, a mixed solution including 14 parts of styrene, 24 parts of stearyl methacrylate, 9 parts of styrene macromer AS-6 (manufactured by Toagosei Co., Ltd.), 9 parts of Plomer PP-500 (manufactured by NOF CORPORATION), 10 parts of methacrylic acid, 0.13 parts of 2-mercaptoethanol, 56 parts of methyl ethyl ketone, and 1.2 parts of 2,2'-azobis (2,4-dimethylvaleronitrile) was prepared and placed in a dropping funnel.

Subsequently, under a nitrogen atmosphere, the mixed solution in the reaction vessel was heated to 75° C. while stirring, and the mixed solution in the dropping funnel was gradually added dropwise over 1 hour. After 2 hours from the completion of the dropwise addition, a solution prepared by dissolving 1.2 parts of 2,2'-azobis (2,4-dimethylvaleronitrile) in 12 parts of methyl ethyl ketone was added dropwise over 3 hours. The solution was further aged at 75° C. for 2 hours and at 80° C. for 2 hours to obtain a methyl ethyl ketone solution of a water-insoluble polymer dispersant. A part of the obtained water-insoluble polymer dispersant solution was isolated by removing the solvent.

The obtained solid content was diluted to 0.1% by mass with tetrahydrofuran, and the weight average molecular weight was measured by GPC. As a result, the isolated solid content had a weight average molecular weight in terms of polystyrene of 25,000.

In addition, 5.0 g of the obtained water-insoluble polymer dispersant solution in terms of solid content, 10.0 g of cyan pigment of Pigment Blue 15:3 (manufactured by Dainichi Seika), 40.0 g of methyl ethyl ketone, 8.0 g of 1 mol/L sodium hydroxide, 82.0 g of ion-exchanged water, and 300 g of 0.1 mm zirconia beads were supplied to the vessel, and dispersed for 6 hours at 1,000 rpm with a ready mill disperser (manufactured by Aimex). The obtained dispersion liquid was concentrated under reduced pressure until the methyl ethyl ketone was sufficiently distilled off with an evaporator and concentrated until the pigment concentration reached 10% to obtain a cyan dispersion liquid CD1 as water-insoluble coloring particles including a pigment having a front surface coated with a water-insoluble polymer dispersant. The average particle diameter of the obtained cyan dispersion liquid was 77 nm.

(Preparation of Cyan Ink C-1)

An ink was prepared so as to have the following ink composition. After preparation, coarse particles were removed with a 5 µm filter to prepare a cyan ink C-1 as an aqueous ink composition. •Cyan dispersion liquid CD 1 . . . 6% •Particle dispersion liquid (AD-1) (in terms of solid content) . . . 2% •Propylene glycol (manufactured by Wako Pure Chemical Industries, Ltd.) . . . 25% •Propylene glycol monobutyl ether . . . 3% •Olfine E1010 (Nisshin Chemical Industry) . . . 0.7% •Olfine E1004 (Nissin Chemical Industry) . . . 0.3% •Ion-exchanged water . . . added so that the total becomes 100%

(Preparation of Cyan Inks C-2 to 10)

Cyan Inks C-2 to 10 were obtained in the same manner as in the preparation of the cyan ink C-1 except that the particle dispersion liquid AD-1 was changed to the particle dispersion liquids AD-2 to AD-10 in the preparation of the cyan ink C-1.

[Evaluation]

Measurement of Infrared Absorption Performance

Infrared absorption performance was measured by the following method.

The particle dispersion liquid (solid content concentration approximately 10% by mass) was diluted 1200 times with distilled water and the amount of infrared absorption at a wavelength of 818 nm was measured using a spectrophotometer (Hitachi, U-4100) using a cell with an optical path length of 1.00 cm. By taking a dilution magnification and an original solid content concentration into account with respect to the obtained absorption intensity, the absorption intensity corrected to a solid concentration of 5.0% by mass conversion was calculated, and the value thereof was taken as infrared absorption performance.

Printing Test (Drying Property Evaluation)

When the cyan inks C-1 to C-10 immediately after preparation were refilled into cartridges of an inkjet printer PX-1004 manufactured by Epson Co., Ltd., and printing was performed on Tokubishi Art Double-sided N (Mitsubishi Paper Mills) with an inkjet printer PX-1004, excellent printing was possible without ejection failure in all the cyan inks C-1 to C-10.

Subsequently, the formed image was irradiated with infrared rays under the conditions of a central wavelength of 810 nm, an irradiation intensity of 3 J/cm², and an irradiation time of 200 ms, and was classified as follows.

—Evaluation Criteria—

A: An image without bleeding was obtained

B: Bleeding occurred

Ink Storability

The obtained cyan inks C-1 to C-10 were stored at a temperature of 60° C. for 10 days. The presence or absence of precipitation after storage was observed and classified as follows. The precipitate was a component mainly composed of a compound.

—Evaluation Criteria—

A . . . no precipitation (precipitate)

B . . . slight precipitation (precipitate) occurred

C . . . Precipitation (precipitate) occurred

As shown in Table 9, in Examples 1 to 8 in which the content of the unit represented by Formula (F1) in the polyester resin was 20% by mass or more, it is found that the occurrence of a precipitate is suppressed as compared with Comparative Example 1 in which the content thereof is less than 20 mass %.

What is claimed is:

1. A particle dispersion liquid comprising:
   an aqueous medium;
   at least one of a compound represented by Formula (I) and a compound represented by Formula (II), which is dispersed in the aqueous medium; and
   at least one of:
   (i) a polymer having alkyl (meth) acrylate as a structural unit, the alkyl (meth) acrylate containing an alicyclic hydrocarbon group having a bridged bond, the polymer having an acid value ranging from 6 mgKOH/g to 100 mgKOH/g, and
   (ii) a polyester resin containing 20% by mass or more of a unit represented by Formula (F1) in the polyester resin:

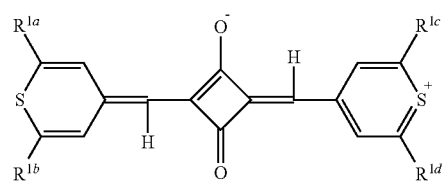

Formula (I)

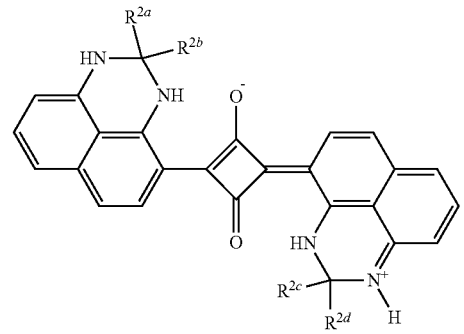

Formula (II)

wherein in Formula (I), $R^{1a}$, $R^{1b}$, $R^{1c}$, and $R^{1d}$ each independently represents an alkyl group or an aryl group;

TABLE 9

| | EXAMPLE | | | | | COMPARATIVE EXAMPLE 1 | EXAMPLE | | COMPARATIVE EXAMPLE 2 | EXAMPLE |
|---|---|---|---|---|---|---|---|---|---|---|
| | 1 | 2 | 3 | 4 | 5 | 1 | 6 | 7 | 2 | 8 |
| Cyan Ink | C-1 | C-2 | C-3 | C-4 | C-5 | C-6 | C-7 | C-8 | C-9 | C-10 |
| Polymer | P05 | P03 | P08 | P09 | P04 | PH01 | P05 | P05 | P05 | PS01 |
| Content of Unit represented by Formula (F1) (%) | 42 | 43 | 36 | 22 | 30 | 17 | 42 | 42 | 42 | 35 |
| Compound | I-a-1 | I-a-1 | I-a-1 | I-a-1 | I-a-1 | I-a-1 | I-a-4 | I-b-2 | II | I-a-1 |
| Neutralization Degree | 90% | 90% | 80% | 80% | 90% | 80% | 90% | 90% | 90% | 90% |
| Particle Dispersion Liquid | AD-1 | AD-2 | AD-3 | AD-4 | AD-5 | AD-6 | AD-7 | AD-8 | AD-9 | AD-10 |
| Infrared Absorption Performance | 407 | 410 | 403 | 400 | 405 | 368 | 410 | 406 | 324 | — |
| Print Test | A | A | A | A | A | A | A | A | B | A |
| Ink Storability | A | A | A | A | A | C | A | A | B | A | in Formula (II), $R^{2a}$, $R^{2b}$, $R^{2c}$, and $R^{2d}$ each independently represents an alkyl group, $R^{2a}$ and $R^{2b}$, and $R^{2c}$ and $R^{2d}$ may be each independently linked to each other to form a ring; and

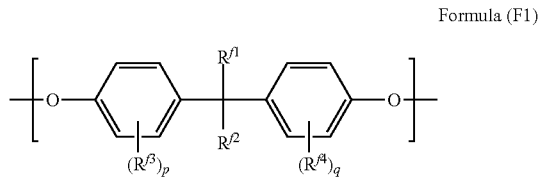

Formula (F1)

in Formula (F1), $R^{f1}$ and $R^{f2}$ each independently represents hydrogen or a methyl group, $R^{f3}$ and $R^{f4}$ represent methyl groups, and p and q each independently represents 0 or 1, wherein the polyester resin has an acid value ranging from 5 mgKOH/g to 50 mgKOH/g.

2. The particle dispersion liquid according to claim 1, wherein each of the compound represented by Formula (I) and the compound represented by Formula (II) has a maximum absorption wavelength ($\lambda_{max}$) between 760 nm and 1,200 nm in a tetrahydrofuran solution.

3. The particle dispersion liquid according to claim 1, wherein each of the compound represented by Formula (I) and the compound represented by Formula (II) has a molar absorption coefficient ($\varepsilon_{max}$) at the maximum absorption wavelength ($\lambda_{max}$) in a tetrahydrofuran solution ranging from $1\times10^5$ Lmol$^{-1}$cm$^{-1}$ to $6\times10^5$ Lmol$^{-1}$cm$^{-1}$.

4. The particle dispersion liquid according to claim 1, wherein the polymer has an average content of the alicyclic hydrocarbon group having the bridged bond in a molecular structure thereof ranging from 7%, by mass to 50% by mass.

5. The particle dispersion liquid according to claim 1, wherein the alicyclic hydrocarbon group having the bridged bond has a bicyclo ring structure or a tricyclo ring structure.

6. The particle dispersion liquid according to claim 4, wherein the polymer has a weight average molecular weight ranging from 3,000 to 200,000.

7. The particle dispersion liquid according to claim 4, wherein the polymer has a glass transition temperature ranging from 40° C. to 150° C.

8. The particle dispersion liquid according to claim 1, wherein the unit represented by Formula (F1) is a unit represented by

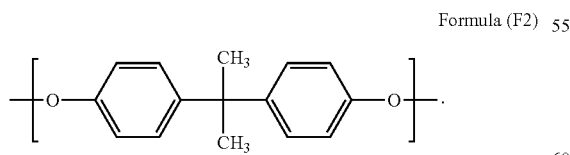

Formula (F2)

9. The particle dispersion liquid according to claim 1, wherein the polyester resin has a weight average molecular weight ranging from 1,000 to 200,000.

10. The particle dispersion liquid according to claim 1, wherein the polyester resin has a glass transition temperature ranging from 40° C. to 150° C.

11. An aqueous ink comprising:
an aqueous medium;
at least one of compounds represented by Formula (I) and Formula (II), which is dispersed in the aqueous medium; and
at least one of:
(i) a polymer having alkyl (meth) acrylate as a structural unit, the alkyl (meth) acrylate containing an alicyclic hydrocarbon group having a bridged bond, the polymer having an acid value ranging from 6 mgKOH/g to 100 mgKOH/g, and
(ii) a polyester resin containing 20% by mass or more of a unit represented by Formula (F1) in the polyester resin:

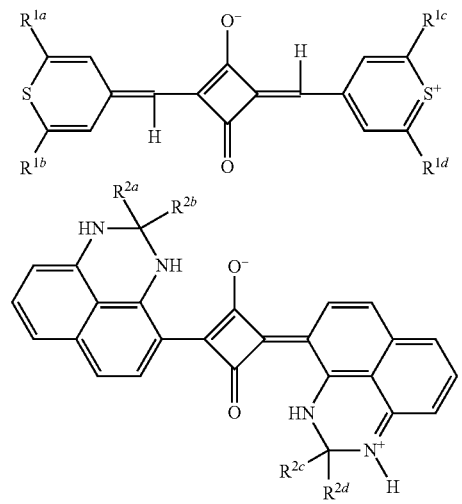

wherein in Formula (I), $R^{1a}$, $R^{1b}$, $R^{1c}$, and $R^{1d}$ each independently represents an alkyl group or an aryl group;
in Formula (II), $R^{2a}$, $R^{2b}$, $R^{2c}$, and $R^{2d}$ each independently represent an alkyl group, $R^{2a}$ and $R^{2b}$, and $R^{2c}$ and $R^{2d}$ may be each independently linked to each other to form a ring; and

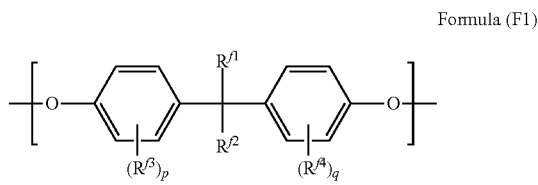

Formula (F1)

in Formula (F1), $R^{f1}$ and $R^{f2}$ each independently represents hydrogen or a methyl group, $R^{f3}$ and $R^{f4}$ represent methyl groups, and p and q each independently represents 0 or 1, wherein the polyester resin has an acid value ranging from 5 mgKOH/g to 50 mgKOH/g.

12. The aqueous ink according to claim 11, wherein the aqueous ink has a pH ranging from 6.5 to 10.5.

13. The aqueous ink according to claim 11, wherein the aqueous ink has a surface tension ranging from 20 mN/m to 40 mN/m.

14. The aqueous ink according to claim 11,
wherein the aqueous ink has a viscosity ranging from 1 mPa·s to 30 mPa·s.

15. The aqueous ink according to claim 11, further comprising:
   a pigment; and
   a pigment dispersant within a range from 0.1% by mass to 100% by mass with respect to the mass of the pigment.

16. The aqueous ink according to claim 11, further comprising:
   a coloring agent within a range from 1% by mass to 25% by mass with respect to the total mass of the aqueous ink.

17. An ink cartridge in which the aqueous ink according to claim 11 is stored.

* * * * *